United States Patent
Bao et al.

(10) Patent No.: US 12,288,525 B2
(45) Date of Patent: Apr. 29, 2025

(54) METHOD OF PROCESSING DATA, ELECTRONIC DEVICE, AND STORAGE MEDIUM

(71) Applicants: Hefei BOE Joint Technology Co., Ltd., Hefei (CN); BOE Technology Group Co., Ltd., Beijing (CN)

(72) Inventors: Wenchao Bao, Beijing (CN); Miao Liu, Beijing (CN); Cheng Xu, Beijing (CN); Yao Zhang, Beijing (CN)

(73) Assignees: Hefei BOE Joint Technology Co., Ltd., Hefei (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/551,617

(22) PCT Filed: Jan. 16, 2023

(86) PCT No.: PCT/CN2023/072292
§ 371 (c)(1),
(2) Date: Sep. 21, 2023

(87) PCT Pub. No.: WO2024/152145
PCT Pub. Date: Jul. 25, 2024

(65) Prior Publication Data
US 2024/0363074 A1 Oct. 31, 2024

(51) Int. Cl.
*G09G 3/3258* (2016.01)

(52) U.S. Cl.
CPC ... *G09G 3/3258* (2013.01); *G09G 2320/0233* (2013.01); *G09G 2320/0295* (2013.01);
(Continued)

(58) Field of Classification Search
CPC ......... G09G 3/3258; G09G 2320/0233; G09G 2320/0295; G09G 2320/045; G09G 2320/0626
See application file for complete search history.

(56) References Cited

U.S. PATENT DOCUMENTS

| 7,940,315 B2 * | 5/2011 | Dungan | H04N 25/76 348/308 |
| 9,007,495 B1 * | 4/2015 | Chin | H04N 19/186 348/246 |

(Continued)

FOREIGN PATENT DOCUMENTS

| CN | 105427796 A | 3/2016 |
| CN | 105321455 B | 4/2018 |

(Continued)

OTHER PUBLICATIONS

Quanyi, Z. et al., "Study on the generation and improvement of dark spot defect in OLED process," Electronics World, dated 2019, DOI:10.19353/j.cnki.dzsj.2019.15.001.

*Primary Examiner* — Julie Anne Watko
(74) *Attorney, Agent, or Firm* — Westman, Champlin & Koehler, P.A.

(57) ABSTRACT

A method of processing data, an electronic device, and a storage medium are provided. The method includes: acquiring voltage values of a plurality of sub-pixels to be detected in the pixel array; determining a plurality of sub-pixels to be compensated from the plurality of sub-pixels to be detected according to the voltage values of the plurality of sub-pixels to be detected, where differences between the voltage values of the plurality of sub-pixels to be compensated and voltage values of corresponding adjacent sub-pixels are greater than or equal to a first filtering threshold; determining at least one sub-pixel column to be compensated according to a position of the plurality of sub-pixels to be compensated in the pixel array; and performing a filtering compensation on the voltage values of a plurality of sub-pixels in the at least one sub-pixel column to be compensated based on a second filtering threshold.

20 Claims, 7 Drawing Sheets

(52) U.S. Cl.
CPC ............... *G09G 2320/045* (2013.01); *G09G 2320/0626* (2013.01)

(56) References Cited

U.S. PATENT DOCUMENTS

| | | | |
|---|---|---|---|
| 9,685,119 B2 | 6/2017 | Kim et al. | |
| 9,898,964 B2 | 2/2018 | Jeon et al. | |
| 9,905,160 B2 | 2/2018 | Woo et al. | |
| 9,978,969 B2 | 5/2018 | Shin et al. | |
| 10,803,807 B2 | 10/2020 | Lee et al. | |
| 10,957,259 B1 | 3/2021 | Wei et al. | |
| 11,189,202 B1 | 11/2021 | Chang et al. | |
| 2013/0022279 A1* | 1/2013 | Hogasten | H04N 25/677 382/218 |
| 2015/0042697 A1* | 2/2015 | Park | G09G 3/2092 345/77 |
| 2015/0379937 A1 | 12/2015 | Kim et al. | |
| 2016/0035281 A1 | 2/2016 | Jeon et al. | |
| 2016/0078805 A1 | 3/2016 | Woo et al. | |
| 2017/0206821 A1* | 7/2017 | Lee | H01L 27/1274 |
| 2017/0243562 A1* | 8/2017 | Hu | G09G 5/10 |
| 2018/0191371 A1* | 7/2018 | Tao | H03M 7/30 |
| 2018/0357944 A1* | 12/2018 | Tang | G09G 3/3208 |
| 2018/0357945 A1* | 12/2018 | Tang | G09G 3/3225 |
| 2020/0020277 A1 | 1/2020 | Lee et al. | |
| 2021/0074224 A1* | 3/2021 | Wei | G09G 3/3233 |

FOREIGN PATENT DOCUMENTS

| | | | |
|---|---|---|---|
| CN | 105427796 B | 4/2018 | |
| CN | 108122544 A | 6/2018 | |
| CN | 103681772 B | 9/2018 | |
| CN | 108806609 A | 11/2018 | |
| CN | 110718189 A | 1/2020 | |
| CN | 213406028 U | 6/2021 | |
| CN | 114495815 A | 5/2022 | |
| WO | WO-2014106278 A1 * | 7/2014 | ........... H04N 5/2257 |

* cited by examiner

METHOD OF PROCESSING DATA, ELECTRONIC DEVICE, AND STORAGE MEDIUM

CROSS-REFERENCE TO RELATED APPLICATION(S)

This application is a Section 371 National Stage Application of International Application No. PCT/CN2023/072292, filed on Jan. 16, 2023, entitled "METHOD AND APPARATUS OF PROCESSING DATA, ELECTRONIC DEVICE, STORAGE MEDIUM, AND PROGRAM PRODUCT", the content of which is incorporated herein by reference in its entirety.

TECHNICAL FIELD

The present disclosure relates to a field of display technology, in particular to a method of processing data, an electronic device, and a storage medium.

BACKGROUND

Due to a manufacturing process of organic light-emitting diode (OLED) display panels, an OLED display panel is prone to a short circuit in a sub-pixel caused by an internal foreign object. A short sub-pixel may cause a harmful line in the OLED display panel. For example, light emitting elements of all sub-pixels in a pixel column where the short sub-pixel is located in a pixel array of the OLED display panel may exhibit an abnormal light emission.

A filtering compensation may be performed on the sub-pixels in the pixel array to improve the above-mentioned abnormal phenomena. However, the filtering compensation may be mistakenly performed on sub-pixels in a common non-uniform brightness region in the OLED display panel, resulting in concentrated thin bright spots on the OLED display panel, which may affect a display quality.

SUMMARY

The present disclosure provides a method of processing data, an electronic device, and a storage medium.

According to an aspect, the present disclosure provides a method of processing data, which is applied to a pixel array, the method including: acquiring voltage values of a plurality of sub-pixels to be detected in a plurality of sub-pixel rows to be detected in the pixel array: determining a plurality of sub-pixels to be compensated from the plurality of sub-pixels to be detected according to the voltage values of the plurality of sub-pixels to be detected, where differences between the voltage values of the plurality of sub-pixels to be compensated and voltage values of corresponding adjacent sub-pixels are greater than or equal to a first filtering threshold, the adjacent sub-pixel and the corresponding sub-pixel to be detected are located in a same sub-pixel row to be detected, and are respectively located in adjacent sub-pixel columns: determining at least one sub-pixel column to be compensated according to a position of the plurality of sub-pixels to be compensated in the pixel array: and performing a filtering compensation on the voltage values of a plurality of sub-pixels in the at least one sub-pixel column to be compensated based on a second filtering threshold, where the second filtering threshold is greater than the first filtering threshold.

For example, the performing a filtering compensation on the voltage values of a plurality of sub-pixels in the at least one sub-pixel column to be compensated based on a second filtering threshold includes: acquiring the voltage values of the plurality of sub-pixels in the at least one sub-pixel column to be compensated and the voltage values of adjacent sub-pixels corresponding to the plurality of sub-pixels, where the adjacent sub-pixels are located in sub-pixel columns adjacent to the at least one sub-pixel column to be compensated: determining the second filtering threshold according to a plurality of differences between the voltage values of the plurality of sub-pixels and the voltage values of the corresponding adjacent sub-pixels, where the second filtering threshold is less than the plurality of differences: and performing a filtering compensation on the voltage values of the plurality of sub-pixels in the at least one sub-pixel column to be compensated based on the second filtering threshold.

For example, the plurality of sub-pixel rows to be detected include N sub-pixel rows to be detected, the plurality of sub-pixels to be compensated include M sub-pixels to be compensated, M≥N>1, M and N are positive integers, and the determining at least one sub-pixel column to be compensated according to a position of the plurality of sub-pixels to be compensated in the pixel array includes: acquiring column coordinates of the M sub-pixels to be compensated in the pixel array: determining i*N target sub-pixels from the M sub-pixels to be compensated according to the column coordinates, where each N target sub-pixels in the i*N target sub-pixels have a same column coordinate, i*N≤M, i≥1, and i is a positive integer: and determining i sub-pixel columns to be compensated according to the column coordinate of each N target sub-pixels in the i*N target sub-pixels, where each of the i sub-pixel columns to be compensated contains corresponding N target sub-pixels.

For example, the first difference is greater than the second difference: and the M sub-pixels to be compensated include i*N target sub-pixels and M-i*N sub-pixels to be compensated, the first difference is a minimum difference in i*N differences between the voltage values of the i*N target sub-pixels and the voltage values of corresponding adjacent sub-pixels, and the second difference is a maximum difference in M-i*N differences between the voltage values of the M-i*N sub-pixels to be compensated and the voltage values of corresponding adjacent sub-pixels.

For example, the second filtering threshold is greater than the second difference and less than or equal to the first difference.

For example, the performing a filtering compensation on the voltage values of a plurality of sub-pixels in the at least one sub-pixel column to be compensated based on a second filtering threshold includes: performing a filtering detection on the voltage values of all sub-pixels in the pixel array based on the second filtering threshold, so as to obtain the plurality of sub-pixels in the at least one sub-pixel column to be compensated, where the differences between the voltage values of the plurality of sub-pixels in the at least one sub-pixel column to be compensated and the voltage values of corresponding adjacent sub-pixels in an adjacent sub-pixel column are greater than or equal to the second filtering threshold: and performing a filtering compensation on the voltage values of the plurality of sub-pixels in the at least one sub-pixel column to be compensated.

For example, the performing a filtering compensation on the voltage values of the plurality of sub-pixels in the at least one sub-pixel column to be compensated includes: acquiring voltage values of a plurality of adjacent sub-pixels respectively corresponding to the plurality of sub-pixels from at least one adjacent sub-pixel column corresponding to the at least one sub-pixel column to be compensated: and updating the voltage values of the plurality of sub-pixels to the voltage values of the plurality of adjacent sub-pixels respectively.

For example, the plurality of sub-pixels in the at least one sub-pixel column to be compensated are electrically connected to a short point respectively.

For example, the plurality of sub-pixel rows to be detected are consecutive sub-pixel rows.

For example, the plurality of sub-pixel rows to be detected are sub-pixel rows at predetermined intervals.

For example, the method of processing the data further includes: performing a filtering compensation on the voltage values of a plurality of sub-pixels in the pixel array based on a third filtering threshold, where the third filtering threshold is greater than the second filtering threshold: determining at least one sub-pixel column to be compensated in a filtering-compensated pixel array, where differences between the voltage values of a plurality of sub-pixels in the at least one sub-pixel column to be compensated and the voltage values of adjacent sub-pixels are greater than the second filtering threshold and less than the third filtering threshold: and performing a filtering compensation on the voltage values of the plurality of sub-pixels in the at least one sub-pixel column to be compensated based on a fourth filtering threshold, where the fourth filtering threshold is less than the third filtering threshold and greater than the first filtering threshold.

For example, the method of processing the data further includes: acquiring voltage values of a plurality of sub-pixels in the pixel array: and performing a filtering compensation on the voltage value of a sub-pixel in response to determining that differences between the voltage value of the sub-pixel and the voltage values of a plurality of adjacent sub-pixels are greater than the first filtering threshold, where the plurality of adjacent sub-pixels are respectively located in a plurality of adjacent sub-pixel columns to a sub-pixel column where the corresponding sub-pixel is located.

According to another aspect, the present disclosure provides an electronic device, including: one or more processors: and a memory configured to store one or more programs, where the one or more programs, when executed by the one or more processors, are configured to cause the one or more processors to implement the method described in embodiments of the present disclosure.

According to another aspect, the present disclosure provides computer-readable storage medium having executable instructions therein, and the instructions, when executed by a processor, are configured to cause the processor to implement the method described in embodiments of the present disclosure.

DETAILED DESCRIPTION OF EMBODIMENTS

Figure 1:
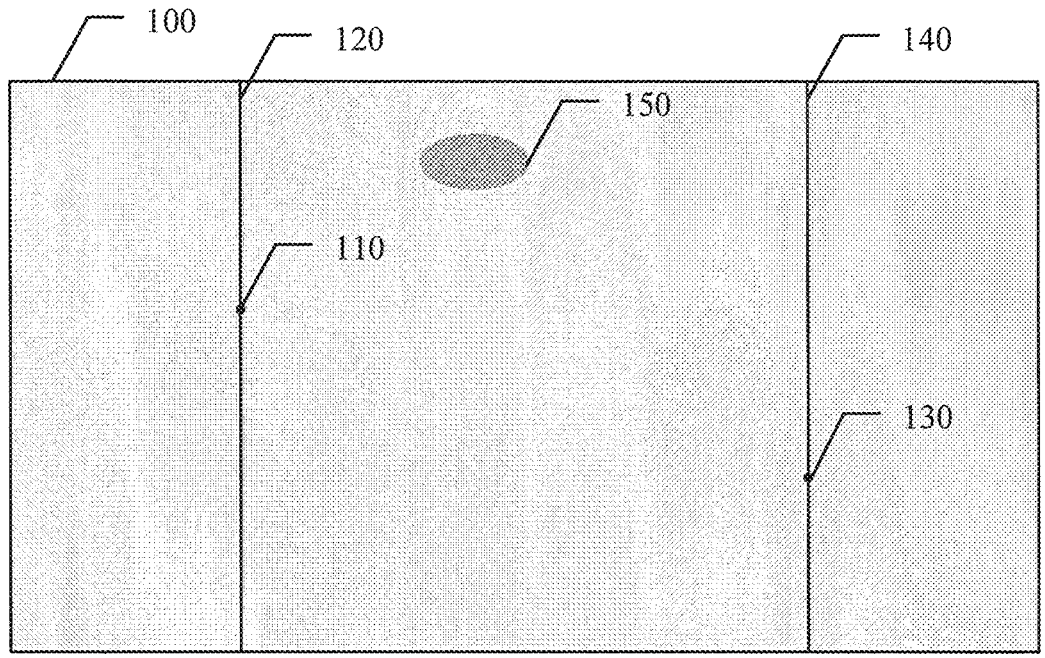
FIG. 1 shows a schematic diagram of an abnormal display on a display panel according to an example.

In order to make objectives, technical solutions and advantages of the present disclosure clearer, the technical solutions in the embodiments of present disclosure are clearly and completely described below with reference to the drawings in the embodiments of the present disclosure. Obviously, the described embodiments are only a part but not all of the embodiments of the present disclosure. Based on the described embodiments of the present disclosure, all additional embodiments obtained by those ordinary skilled in the art without carrying out inventive effort fall within the protection scope of the present disclosure. It should be noted that throughout the drawings, the same elements are represented by the same or similar reference numerals. In the following descriptions, some specific embodiments are only used for descriptive purposes and should not be construed as limiting the present disclosure, but rather examples of the embodiments of the present disclosure. When it is possible to cause confusions in the understanding of the present disclosure, conventional structures or configurations will be omitted. It should be noted that the shape and size of each component in the figures do not reflect the actual size and ratio, but just illustrate the contents of the embodiments of the present disclosure.

Unless otherwise defined, the technical or scientific terms used in the embodiments of the present disclosure should have the usual meanings understood by those skilled in the art. The words "first," "second," and the like used in the embodiments of the present disclosure do not indicate any order, quantity or importance, but are just used to distinguish different composition parts.

In technical solutions of the present disclosure, a collection, a storage, a use, a processing, a transmission, a provision, a disclosure, an application and other processing of user personal information involved comply with provisions of relevant laws and regulations, take necessary security measures, and do not violate public order and good custom.

In the technical solutions of the present disclosure, the acquisition or collection of user personal information has been authorized or allowed by users.

Various embodiments according to the present disclosure will be described in detail below with reference to the accompanying drawings. It should be noted that in the accompanying drawings, the same reference numerals are assigned to composition parts that have substantially the same or similar structures and functions, and repeated descriptions about them will be omitted.

FIG. 1 shows a schematic diagram of an abnormal display on a display panel according to an example.

As shown in FIG. 1, an OLED display panel 100 has a short point 110 and a short point 130 caused by a manufacturing process. The short point 110 and the short point 130 are generated by short circuits of corresponding sub-pixels in the pixel array, and may cause harmful lines on the OLED display panel 100. For example, the short point 110 may cause an obvious abnormal line 120 on a display screen of the OLED display panel 100, and the short point 130 may cause an obvious abnormal line 140 on the display screen of the OLED display panel 100. The abnormal line 120 and the abnormal line 140 run through the entire OLED display panel 100 from top to bottom.

Driving transistors of sub-pixels corresponding to the abnormal line 120 and the abnormal line 140 in the pixel array have abnormal threshold voltages, resulting in abnormal brightness of light emitting elements of the sub-pixels. For example, a threshold voltage of a driving transistor of a sub-pixel on the abnormal line 120 is less than the threshold voltages of the driving transistors of two adjacent sub-pixels (two adjacent sub-pixels on the left and right in a direction shown in FIG. 1), and differences between the threshold voltage of the driving transistor of the sub-pixel on the abnormal line 120 and the threshold voltages of the driving transistors of the two adjacent sub-pixels are both greater than a predetermined difference, so that the brightness of the light emitting element of the sub-pixel may be abnormally lower than the brightness of the light emitting elements of the two adjacent sub-pixels. For example, the threshold voltage of the driving transistor of the sub-pixel on the abnormal line 120 is greater than the threshold voltages of the driving transistors of two adjacent sub-pixels, and the differences between the threshold voltage of the driving transistor of the sub-pixel on the abnormal line 120 and the threshold voltages of the driving transistors of the two adjacent sub-pixels are both greater than the predetermined difference, so that the brightness of the light emitting element of the sub-pixel may be abnormally greater than the brightness of the light emitting elements of the two adjacent sub-pixels. An adjacent sub-pixel and the sub-pixel are respectively located in two adjacent sub-pixel columns, and the adjacent sub-pixel and the sub-pixel are located in a same sub-pixel row.

A degree of short circuit of the short point 110 and a degree of short circuit of the short point 130 may affect a degree of abnormal display of the abnormal line 120 and a degree of abnormal display of the abnormal line 140. For example, if the degree of short circuit of the short point 110 is greater than that of the short point 130, the degree of abnormal display of the abnormal line 120 may be greater than that of the abnormal line 140. Accordingly, a difference between the brightness of the light emitting element in a sub-pixel corresponding to the abnormal line 120 and the brightness of the light emitting element in an adjacent sub-pixel is greater than a difference between the brightness of the light emitting element in a sub-pixel corresponding to the abnormal line 140 and the brightness of the light emitting element in an adjacent sub-pixel. In the OLED display panel 100, the abnormal line 120 may be more obvious than the abnormal line 140.

As shown in FIG. 1, the OLED display panel 100 further includes a non-uniform brightness region 150. The threshold voltages of driving transistors of a plurality of sub-pixels corresponding to the non-uniform brightness region 150 in the pixel array may have a poor short range uniformity. For example, the threshold voltages of the driving transistors of a plurality of sub-pixels in a uniform brightness region may vary according to a predetermined pattern, and the threshold voltages of the driving transistors of four sub-pixels in a same sub-pixel row in the uniform brightness region may be 1V, 1.1V, 1.2V and 1.3V, respectively. However, the threshold voltages of the driving transistors of four sub-pixels in a same sub-pixel row in the non-uniform brightness region 150 may be 1V, 0.9V, 1.3V and 1V, respectively, which results in non-uniform brightness of the corresponding light emitting elements.

In the OLED display panel 100, the driving transistors of the plurality of sub-pixels corresponding to the abnormal line 120 and the abnormal line 140 in the pixel array have abnormal threshold voltages, and the driving transistors of the plurality of sub-pixels corresponding to the non-uniform brightness region 150 in the pixel array also have abnormal threshold voltages. On the display screen of the OLED display panel 100, the abnormal line 120 and the abnormal line 140 may affect the display quality, and it is required to perform a filtering compensation on the threshold voltages of the driving transistors of the plurality of sub-pixels corresponding to the abnormal line 120 and the abnormal line 140 in the pixel array. The non-uniform brightness region 150 may not significantly affect the display quality, and it is not required to perform a filtering compensation on the threshold voltages of the driving transistors of the plurality of sub-pixels corresponding to the non-uniform brightness region 150 in the pixel array. A filtering compensation for the non-uniform brightness region 150 may actually cause concentrated thin bright spots in the non-uniform brightness region 150, which may affect the display quality.

The filtering compensation generally involves a progressive compensation for sub-pixel rows in the pixel array. Therefore, when a sub-pixel row contains a sub-pixel on the abnormal line 120, a sub-pixel on the abnormal line 130 and a sub-pixel in the non-uniform brightness region 150, the filtering compensation for the sub-pixel row may be performed simultaneously on the threshold voltages of the driving transistors of the sub-pixels on the abnormal line 120, the abnormal line 130 and the non-uniform brightness region 150, which may result in concentrated thin bright spots in the non-uniform brightness region 150.

As the differences between the threshold voltages of the driving transistors of the sub-pixels on the abnormal line 120 and the abnormal line 130 and the threshold voltages of the driving transistors of corresponding adjacent sub-pixels are greater than the differences between the threshold voltages of the driving transistors of the sub-pixels in the non-uniform brightness region 150 and the threshold voltages of the driving transistors of corresponding adjacent sub-pixels, a filtering compensation may be performed on the sub-pixels in the pixel array based on a large filtering threshold. For example, when it is determined that the differences between the threshold voltages of the driving transistors of the sub-pixels on the abnormal line 120 and the abnormal line 130 and the threshold voltages of the driving transistors of the corresponding adjacent sub-pixels are greater than a filtering threshold, a filtering compensation may be performed on the threshold voltages of the driving transistors of the sub-pixels on the abnormal line 120 and the abnormal line 130. When it is determined that the differences between the threshold voltages of the driving transistors of the sub-pixels in the non-uniform brightness region 150 and the threshold voltages of the driving transistors of the corresponding adjacent sub-pixels are less than the filtering threshold, the filtering compensation is not performed on the threshold voltages of the driving transistors of the sub-pixels in the non-uniform brightness region 150.

However, as the degree of short circuit of the short point 110 is greater than that of the short point 130, differences between the threshold voltages of the driving transistors of the sub-pixels on the abnormal line 120 and the threshold voltages of the driving transistors of the corresponding adjacent sub-pixels are greater than differences between the threshold voltages of the driving transistors of the sub-pixels on the abnormal line 140 and the threshold voltages of the driving transistors of the corresponding adjacent sub-pixels. Therefore, when the filtering compensation is performed on the sub-pixels in the pixel array based on a large filtering threshold, it is possible that the filtering compensation is only performed on the threshold voltages of the driving transistors of the sub-pixels on the abnormal line 120, but not performed on the threshold voltages of the driving transistors of the sub-pixels on the abnormal line 140.

According to the method of processing the data provided in the present disclosure, two filtering detections are performed on the threshold voltages of the driving transistors of all sub-pixels in the pixel array, so that the filtering compensation is performed on the sub-pixels corresponding to the abnormal lines, but not performed on the sub-pixels corresponding to the non-uniform brightness region. In a first filtering detection, it is possible to determine a difference between the threshold voltage of the sub-pixel on the abnormal line and the threshold voltage of the corresponding adjacent sub-pixel and a difference between the threshold voltage of the sub-pixel in the non-uniform brightness region and the threshold voltage of the corresponding adjacent sub-pixel, and determine a filtering threshold based on the two differences of threshold voltages. In a second filtering detection, a filtering detection may be performed on the threshold voltages of the driving transistors of all sub-pixels in the pixel array based on the filtering threshold, so that the sub-pixels on the abnormal line meet a filtering compensation condition while the sub-pixels in the non-uniform brightness region do not meet the filtering compensation condition, and then the filtering compensation is performed on the sub-pixels that meet the filtering compensation condition. According to the method of processing the data provided in the present disclosure, the filtering compensation may be performed on the sub-pixels corresponding to the abnormal line of the OLED display panel, but not performed on the sub-pixels corresponding to the non-uniform brightness region, so that the display quality of the OLED display panel may be improved.

Figure 2:
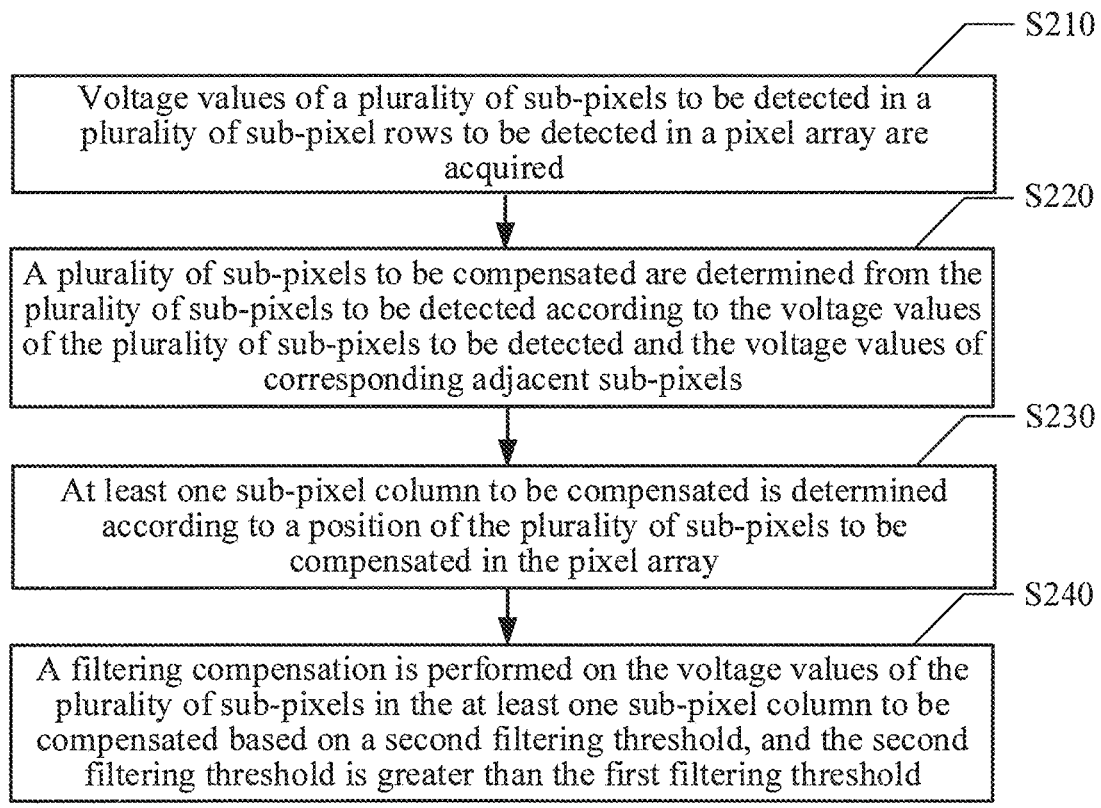
FIG. 2 shows a flowchart of a method of processing data according to embodiments of the present disclosure.

FIG. 2 shows a flowchart of a method of processing data according to embodiments of the present disclosure.

As shown in FIG. 2, the method of processing the data according to embodiments of the present disclosure may include the following steps. It should be noted that the sequence number of each step in the following method is just used to indicate the step for ease of description, and should not be regarded as indicating an execution order of the steps. Unless explicitly stated, the method does not need to be performed exactly in the order shown. The method of processing the data may be applied to a pixel array.

In step S210, voltage values of a plurality of sub-pixels to be detected in a plurality of sub-pixel rows to be detected in a pixel array are acquired.

For example, the plurality of sub-pixel rows to be detected may be a plurality of sub-pixel rows in the pixel array, and the plurality of sub-pixel rows to be detected include at least two sub-pixel rows in the plurality of sub-pixel rows in the pixel array. The plurality of sub-pixel rows to be detected may be consecutive sub-pixel rows. For example, the plurality of sub-pixel rows to be detected include a tenth sub-pixel row, an eleventh sub-pixel row, a twelfth sub-pixel row and a fourteenth sub-pixel row in the pixel array. The plurality of sub-pixel rows to be detected may also be a plurality of sub-pixel rows at predetermined intervals. For example, the plurality of sub-pixel rows to be detected include a tenth sub-pixel row, a twentieth sub-pixel row, a thirtieth sub-pixel row and a fortieth sub-pixel row in the pixel array. The plurality of sub-pixel rows to be detected may also be fixed sub-pixel rows. For example, for a pixel array of each display panel, the plurality of sub-pixel rows to be detected include a tenth sub-pixel row, a twentieth sub-pixel row, a thirtieth sub-pixel row and a fortieth sub-pixel row in the pixel array. The plurality of sub-pixel rows to be detected may also be randomly selected sub-pixel rows. For a pixel array of each display panel, the plurality of sub-pixel rows to be detected may be randomly selected by a corresponding random program.

For example, the voltage value of the sub-pixel to be detected may be the threshold voltage of the driving transistor in the sub-pixel to be detected.

In step S220, a plurality of sub-pixels to be compensated are determined from the plurality of sub-pixels to be detected according to the voltage values of the plurality of sub-pixels to be detected and the voltage values of corresponding adjacent sub-pixels.

A sub-pixel to be detected and an adjacent sub-pixel are both sub-pixels to be detected in a sub-pixel row to be detected. The sub-pixel to be detected and the corresponding adjacent sub-pixel are located in a same sub-pixel row to be detected, and the adjacent sub-pixel and the corresponding sub-pixel to be detected are respectively located in adjacent sub-pixel columns. The sub-pixel to be detected may have two adjacent sub-pixels. For example, the two adjacent sub-pixels and the corresponding sub-pixel to be detected are sub-pixels in a sub-pixel row to be detected. The two adjacent sub-pixels are respectively located in a first sub-pixel column and a third sub-pixel column, and the sub-pixel to be detected is located in a second sub-pixel column.

Differences between the voltage values of the plurality of sub-pixels to be compensated and the voltage values of the corresponding adjacent sub-pixels are greater than or equal to a first filtering threshold. For example, the first filtering threshold may be a predetermined filtering threshold. When it is determined that the differences between the voltage value of a sub-pixel to be detected and the voltage values of corresponding two adjacent sub-pixels are both greater than or equal to the first filtering threshold, it is determined that the sub-pixel to be detected is a sub-pixel to be compensated. When it is determined that the difference between the voltage value of the sub-pixel to be detected and the voltage value of the corresponding adjacent sub-pixel is less than the first filtering threshold, it is determined that the sub-pixel to be detected does not require compensation.

The first filtering threshold may be a small filtering threshold, such as 1V or 0.1V, so that the difference between the voltage value of the sub-pixel on the abnormal line and the voltage value of the corresponding adjacent sub-pixel is greater than or equal to the first filtering threshold and the difference between the voltage value of the sub-pixel in the non-uniform brightness region and the voltage value of the corresponding adjacent sub-pixel is also greater than or equal to the first filtering threshold. Therefore, the sub-pixels on the abnormal line and the sub-pixels in the non-uniform brightness region may be determined from the plurality of sub-pixels to be detected based on the first filtering threshold, and the plurality of sub-pixels to be compensated include the sub-pixels on the abnormal line and the sub-pixels in the non-uniform brightness region.

A value of the first filtering threshold may be determined by those skilled in the art according to an actual situation of a driving voltage in the pixel array, and is not limited in the present disclosure.

In step S230, at least one sub-pixel column to be compensated is determined according to a position of the plurality of sub-pixels to be compensated in the pixel array.

For example, the plurality of sub-pixels to be compensated include the sub-pixels on the abnormal line and the sub-pixels in the non-uniform brightness region. The sub-pixels on the abnormal line have a same column coordinate in the pixel array, and the sub-pixels in the non-uniform brightness region have a same row coordinate in the pixel array. For example, when it is determined that the plurality of sub-pixels to be compensated include four sub-pixels to be compensated having the same column coordinate, these four sub-pixels to be compensated are located on the same abnormal line, and the sub-pixel column where these four sub-pixels are located is the sub-pixel column to be compensated. When it is determined that the plurality of sub-pixels to be compensated include four sub-pixels to be compensated having a same row coordinate, these four sub-pixels to be compensated are located in the non-uniform brightness region.

The position of the sub-pixel column to be compensated corresponding to the abnormal line in the pixel array may be determined according to the plurality of sub-pixels to be compensated having the same column coordinate. For example, if the column coordinate of the plurality of sub-pixels to be compensated having the same column coordinate is a second column, then the sub-pixel column to be compensated corresponding to the abnormal line is the second column in the pixel array.

For example, when it is determined that the plurality of sub-pixels to be compensated include a plurality of groups of sub-pixels to be compensated having the same column coordinate, a plurality of sub-pixel columns to be compensated may be determined. For example, the plurality of sub-pixels to be compensated include two groups of sub-pixels to be compensated having the same column coordinate, and a plurality of sub-pixels to be compensated in each group of sub-pixels to be compensated have the same column coordinate, then the corresponding sub-pixel columns to be compensated may be determined according to the column coordinate of a plurality of sub-pixels to be compensated in each group of sub-pixels to be compensated.

For example, the plurality of sub-pixels in the at least one sub-pixel column to be compensated are electrically connected to the short point respectively. The short point may be at least one sub-pixel in a plurality of sub-pixels in the sub-pixel column to be compensated, and the at least one sub-pixel is short circuited. The sub-pixel column where the short sub-pixel is located is the sub-pixel column to be compensated.

In step S240, a filtering compensation is performed on the voltage values of the plurality of sub-pixels in the at least one sub-pixel column to be compensated based on a second filtering threshold, and the second filtering threshold is greater than the first filtering threshold.

For example, as the differences between the voltage values of sub-pixels on the abnormal line and the voltage values of corresponding adjacent sub-pixels are greater than the differences between the voltage values of sub-pixels in the non-uniform brightness region and the voltage values of corresponding adjacent sub-pixels, the second filtering threshold may be a large filtering threshold, so that the differences between the voltage values of a plurality of sub-pixels in the sub-pixel column to be compensated and the voltage values of corresponding adjacent sub-pixels are greater than the second filtering threshold, and the differences between the voltage values of a plurality of sub-pixels in the non-uniform brightness region and the voltage values of corresponding adjacent sub-pixels are less than the second filtering threshold.

In embodiments of the present disclosure, step S240 of performing a filtering compensation on the voltage values of the plurality of sub-pixels in the at least one sub-pixel column to be compensated based on the second filtering threshold may include: acquiring the voltage values of the plurality of sub-pixels in the at least one sub-pixel column to be compensated and the voltage values of adjacent sub-pixels corresponding to the plurality of sub-pixels: determining the second filtering threshold according to a plurality of differences between the voltage values of the plurality of sub-pixels and the voltage values of the corresponding adjacent sub-pixels, where the second filtering threshold is less than the plurality of differences: and performing a filtering compensation on the voltage values of the plurality of sub-pixels in the at least one sub-pixel column to be compensated based on the second filtering threshold.

For example, the adjacent sub-pixels corresponding to the plurality of sub-pixels in the sub-pixel column to be compensated are located in sub-pixel columns adjacent to the at least one sub-pixel column to be compensated. The plurality of sub-pixels and the corresponding adjacent sub-pixels are respectively located in the same sub-pixel row.

For example, a minimum difference may be determined from the plurality of differences between the voltage values of the plurality of sub-pixels and the voltage values of the corresponding adjacent sub-pixels, and the minimum difference may be determined as the second filtering threshold. Based on the second filtering threshold, the filtering compensation may be performed on such sub-pixels in the pixel array that the differences between the voltage values of the sub-pixels and the voltage values of the corresponding adjacent sub-pixels are greater than the second filtering threshold, so that the filtering compensation may be performed on the voltage values of the plurality of sub-pixels in the sub-pixel column to be compensated.

As the differences between the voltage values of the sub-pixels on the abnormal line and the voltage values of the corresponding adjacent sub-pixels are much greater than the differences between the voltage values of the sub-pixels in the non-uniform brightness region and the voltage values of the corresponding adjacent sub-pixels, the second filtering threshold is set to be much greater than the first filtering threshold, so that the second filtering threshold is greater than the differences between the voltage values of the sub-pixels in the non-uniform brightness region and the voltage values of the corresponding adjacent sub-pixels. When a filtering compensation is performed based on the second filtering threshold, the sub-pixels in the non-uniform brightness region in the pixel array may be filtered out, so that the filtering compensation is not performed on the sub-pixels in the non-uniform brightness region.

The present disclosure provides an embodiment of determining the sub-pixel column to be compensated and the second filtering threshold.

The plurality of sub-pixel rows to be detected include N sub-pixel rows to be detected, and the plurality of sub-pixels to be compensated include M sub-pixels to be compensated, where M≥N>1, and M and N are positive integers.

Step S230 of determining at least one sub-pixel column to be compensated according to the position of the plurality of sub-pixels to be compensated in the pixel array may include: acquiring column coordinates of the M sub-pixels to be compensated in the pixel array: determining i*N target sub-pixels from the M sub-pixels to be compensated according to the column coordinates, where each N target sub-pixels in the i*N target sub-pixels have the same column coordinate, i*N≤M, i≥1, and i is a positive integer: and determining i sub-pixel columns to be compensated according to the column coordinate of each N target sub-pixels in the i*N target sub-pixels, where each of the i sub-pixel columns to be compensated contains corresponding N target sub-pixels.

For example, each N target sub-pixels in the i*N target sub-pixels have the same column coordinate, the N target sub-pixels are located in a same sub-pixel column, and the sub-pixel column corresponds to an abnormal line. When it is determined that the M sub-pixels to be compensated include i*N target sub-pixels, the i sub-pixel columns to be compensated corresponding to i abnormal lines may be determined according to the M sub-pixels to be compensated.

For example, the M sub-pixels to be compensated include i*N target sub-pixels and M-i*N sub-pixels to be compensated. The i*N target sub-pixels are located in the sub-pixel columns to be compensated corresponding to the abnormal lines, while the M-i*N sub-pixels to be compensated are located in the non-uniform brightness region. A minimum difference in i*N differences between the voltage values of the i*N target sub-pixels in the sub-pixel columns to be compensated and the voltage values of the corresponding adjacent sub-pixels is a first difference, and a maximum difference in M-i*N differences between the voltage values of the M-i*N sub-pixels to be compensated in the non-uniform brightness region and the voltage values of the corresponding adjacent sub-pixels is a second difference. As the differences between the voltage values of the target sub-pixels in the sub-pixel columns to be compensated and the voltage values of the corresponding adjacent sub-pixels are greater than the differences between the voltage values of the sub-pixels to be compensated in the non-uniform brightness region and the voltage values of the corresponding adjacent sub-pixels, the first difference is greater than the second difference.

For example, the second filtering threshold may be set to be greater than the second difference and less than or equal to the first difference. When a filtering compensation is performed on all sub-pixels in the pixel array based on the second filtering threshold, the filtering compensation may be performed on such sub-pixels that the differences between the voltage values of the sub-pixels and the voltage values of the corresponding adjacent sub-pixels are greater than the second filtering threshold, and the filtering compensation is not performed on such sub-pixels that the differences between the voltage values of the sub-pixels and the voltage values of the corresponding adjacent sub-pixels are less than the second filtering threshold, so that the voltage values of the plurality of sub-pixels in the sub-pixel column to be compensated may be filtering-compensated, and the sub-pixels in the non-uniform brightness region may not be filtering-compensated. In this way, it is possible to eliminate the harmful line on the display screen and avoid appearing thin bright spots on the display screen, so that the display quality may be improved.

Figure 3A:
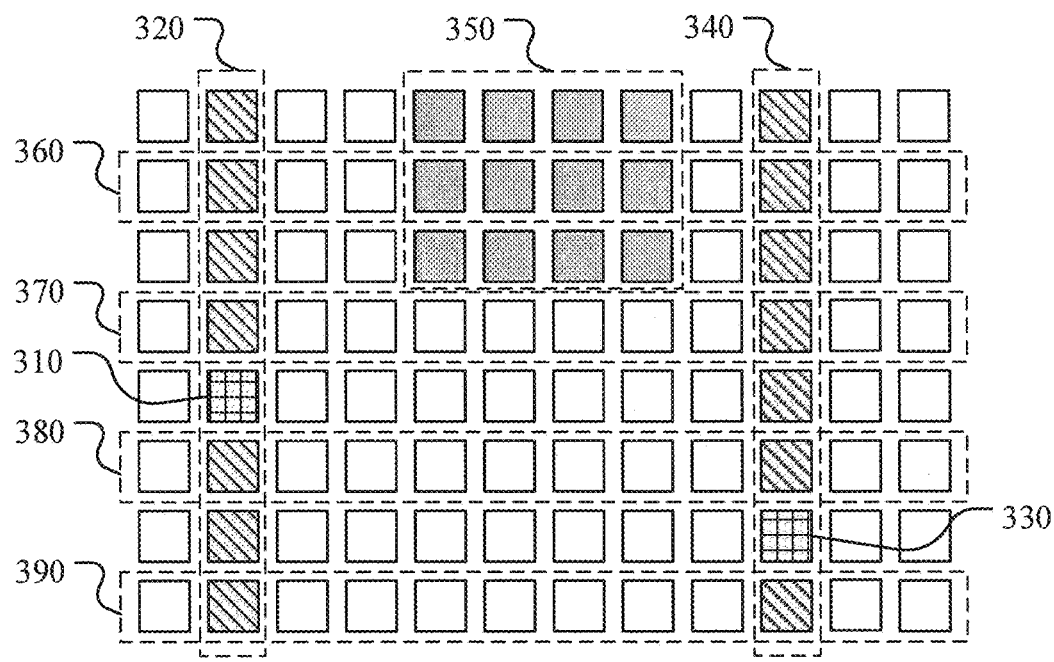
FIG. 3A shows a schematic diagram of a pixel array according to embodiments of the present disclosure.
Figure 3B:
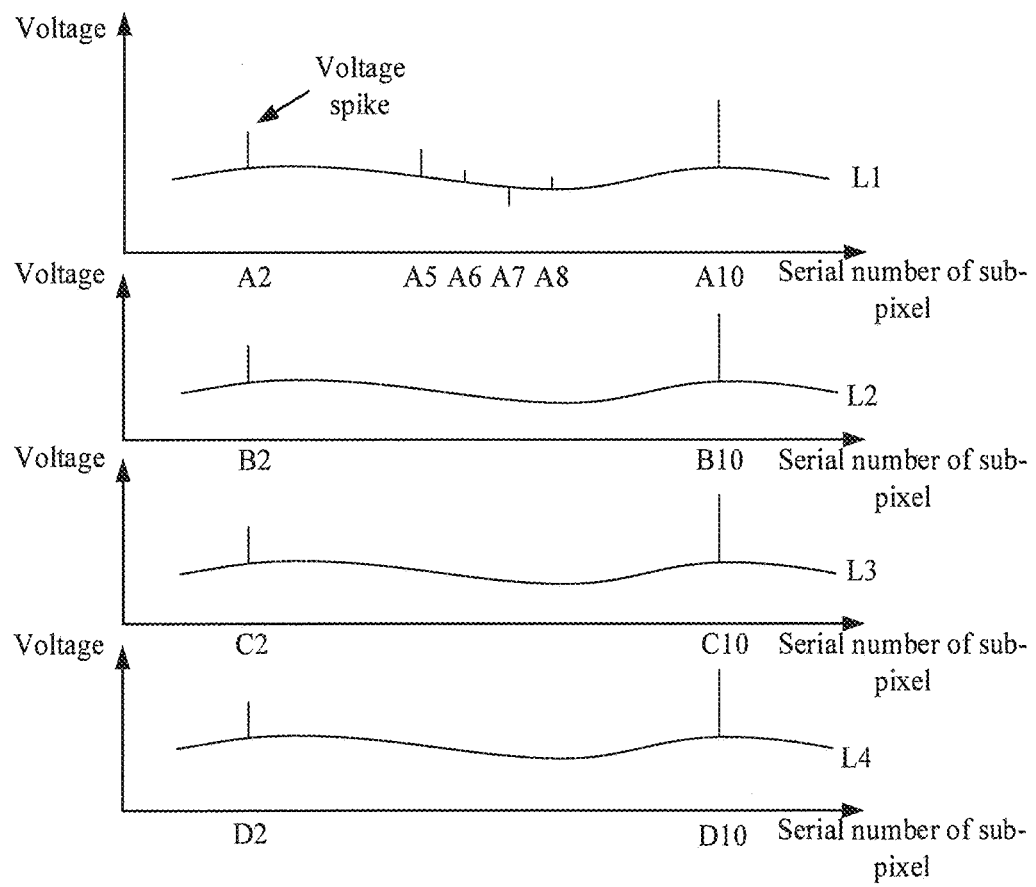
FIG. 3B shows a schematic diagram of voltage values of sub-pixels in the pixel array according to embodiments of the present disclosure.

FIG. 3A shows a schematic diagram of a pixel array according to embodiments of the present disclosure. FIG. 3B shows a schematic diagram of voltage values of sub-pixels in the pixel array according to embodiments of the present disclosure.

As shown in FIG. 3A, the pixel array contains 8x12 sub-pixels, each sub-pixel row contains twelve sub-pixels, and each sub-pixel column contains eight sub-pixels. The pixel array includes a short sub-pixel 310, a short sub-pixel 330, and a non-uniform brightness region 350. The short sub-pixel 310 causes an abnormal brightness of sub-pixels in a sub-pixel column 320, and the short sub-pixel 330 causes an abnormal brightness of sub-pixels in a sub-pixel column 340. The sub-pixel column 320 and the sub-pixel column 340 are located in a second sub-pixel column and a tenth sub-pixel column in the pixel array, respectively. The non-uniform brightness region 350 contains a plurality of sub-pixels located in fifth to eighth sub-pixel columns and first to third sub-pixel rows in the pixel array.

Sub-pixel rows to be detected 360, 370, 380 and 390 may be determined from the pixel array, and a filtering detection may be performed on twelve sub-pixels in each of the sub-pixel rows to be detected 360, 370, 380 and 390 based on the first filtering threshold. For example, the sub-pixel rows to be detected 360, 370, 380 and 390 may be a second sub-pixel row, a fourth sub-pixel row, a sixth sub-pixel row and an eighth sub-pixel row in the pixel array, respectively.

For example, the filtering detection process may include: performing a filtering detection on the voltage values of twelve sub-pixels in each of the sub-pixel rows to be detected 360, 370, 380 and 390 based on the first filtering threshold, so as to determine a plurality of sub-pixels to be compensated from the twelve sub-pixels in each of the sub-pixel rows to be detected 360, 370, 380 and 390: determining sub-pixel columns to be compensated 320 and 340 according to the target sub-pixels in the plurality of sub-pixels to be compensated: and performing a filtering compensation on the voltage values of a plurality of sub-pixels in the sub-pixel columns to be compensated 320 and 340 based on the second filtering threshold.

When performing the filtering detection on the voltage values of twelve sub-pixels in each of the sub-pixel rows to be detected 360, 370, 380 and 390, the voltage values of twelve sub-pixels in each of the sub-pixel rows to be detected 360, 370, 380 and 390 shown in FIG. 3B may be obtained.

L1, L2, L3 and L4 shown in FIG. 3B respectively represent the voltage values of twelve sub-pixels in each of the sub-pixel rows to be detected 360, 370, 380 and 390 as shown in FIG. 3A. In L1, A2 represents the voltage value of a sub-pixel in the sub-pixel row to be detected 360 that is located in the second column, A5, A6, A7 and A8 represent the voltage values of sub-pixels in the sub-pixel row to be detected 360 that are respectively located in the fifth column, the sixth column, the seventh column and the eighth column, and A10 represents the voltage value of a sub-pixel in the sub-pixel row to be detected 360 that is located in the tenth column. In L2, B2 and B10 represent the voltage values of sub-pixels in the sub-pixel row to be detected 370 that are respectively located in the second column and the tenth column. In L3, C2 and C10 represent the voltage values of sub-pixels in the sub-pixel row to be detected 380 that are respectively located in the second column and the tenth column. In L4, D2 and D10 represent the voltage values of sub-pixels in the sub-pixel row to be detected 390 that are respectively located in the second column and the tenth column.

As shown in FIG. 3B, in L1, the voltage values A2, A5, A6, A7, A8 and A10 are abnormal. In L2, the voltage values B2 and B10 are abnormal. In L3, the voltage values C2 and C10 are abnormal. In L4, the voltage values D2 and D10 are abnormal.

For example, differences between the abnormal voltage value and two adjacent voltage values are both greater than a difference between any two other adjacent voltage values. For example, in L1, a difference between the voltage value A2 of the sub-pixel in the second column and the voltage value of the sub-pixel in the first column and a difference between the voltage value A2 of the sub-pixel in the second column and the voltage value of the sub-pixel in the third column are both greater than a difference between the voltage value of the sub-pixel in the third column and the voltage value of the sub-pixel in the fourth column.

For example, the differences between the abnormal voltage value and the two adjacent voltage values are both greater than the first filtering threshold.

In a process of performing a filtering detection based on the first filtering threshold, a plurality of sub-pixels to be compensated are determined from twelve sub-pixels in each of the sub-pixel rows to be detected 360, 370, 380 and 390. The plurality of sub-pixels to be compensated include: the sub-pixels in the sub-pixel row to be detected 360 that are respectively located in the second column, the fifth column, the sixth column, the seventh column, the eighth column and the tenth column, the sub-pixels in the sub-pixel row to be detected 370 that are respectively located in the second column and the tenth column, the sub-pixels in the sub-pixel row to be detected 380 that are respectively located in the second column and the tenth column, and the sub-pixels in the sub-pixel row to be detected 390 that are respectively located in the second column and the tenth column.

In the plurality of sub-pixels to be compensated, the sub-pixel in the sub-pixel row to be detected 360 that is located in the second column, the sub-pixel in the sub-pixel row to be detected 370 that is located in the second column, the sub-pixel in the sub-pixel row to be detected 380 that is located in the second column and the sub-pixel in the sub-pixel row to be detected 390 that is located in the second column have the same column coordinate. Therefore, it may be determined that the second sub-pixel column is the sub-pixel column to be detected 320.

In the plurality of sub-pixels to be compensated, the sub-pixel in the sub-pixel row to be detected 360 that is located in the tenth column, the sub-pixel in the sub-pixel row to be detected 370 that is located in the tenth column, the sub-pixel in the sub-pixel row to be detected 380 that is located in the tenth column and the sub-pixel in the sub-pixel row to be detected 390 that is located in the tenth column have the same column coordinate. Therefore, it may be determined that the tenth sub-pixel column is the sub-pixel column to be detected 340.

The sub-pixels in the sub-pixel row to be detected 360 that are respectively located in the fifth column, the sixth column, the seventh column and the eighth column are sub-pixels in the non-uniform brightness region. The differences between the voltage values of the sub-pixels in the sub-pixel row to be detected 360 that are respectively located in the fifth column, the sixth column, the seventh column and the eighth column and the voltage values of the corresponding adjacent sub-pixels are less than the differences between the voltage values of the sub-pixels in the sub-pixel column to be detected 320 and the sub-pixel column to be detected 340 and the voltage values of the corresponding adjacent sub-pixels.

A second filtering threshold may be determined according to the differences between the voltage values of the sub-pixels in the sub-pixel column to be detected 320 and the sub-pixel column to be detected 340 and the voltage values of the corresponding adjacent sub-pixels, so that the differences between the voltage values of the sub-pixels in the sub-pixel column to be detected 320 and the sub-pixel column to be detected 340 and the voltage values of the corresponding adjacent sub-pixels are greater than or equal to the second filtering threshold, and the differences between the voltage values of the sub-pixels in the sub-pixel row to be detected 360 that are respectively located in the fifth column, the sixth column, the seventh column and the eighth column and the voltage values of the corresponding adjacent sub-pixels are less than the second filtering threshold. The filtering compensation is performed on the voltage values of all sub-pixels in the pixel array based on the second filtering threshold, so that the filtering compensation is performed on the voltage values of the plurality of sub-pixels in the sub-pixel columns to be compensated 320 and 340.

Figure 4A:
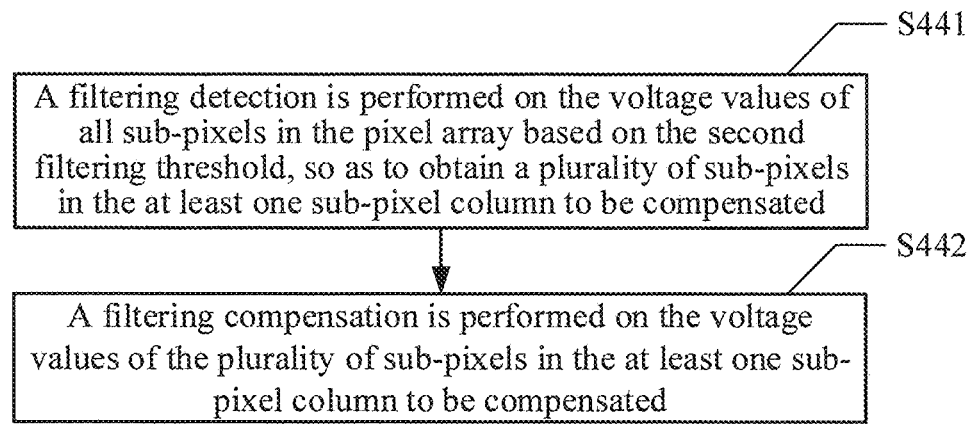
FIG. 4A shows a flowchart of performing a filtering compensation according to embodiments of the present disclosure.

FIG. 4A shows a flowchart of performing a filtering compensation according to embodiments of the present disclosure.

As shown in FIG. 4A, step S240 of performing a filtering compensation on the voltage values of the plurality of sub-pixels in the at least one sub-pixel column to be compensated based on the second filtering threshold may include step S441 to step S442.

In step S441, a filtering detection is performed on the voltage values of all sub-pixels in the pixel array based on the second filtering threshold, so as to obtain a plurality of sub-pixels in the at least one sub-pixel column to be compensated.

In step S442, a filtering compensation is performed on the voltage values of the plurality of sub-pixels in the at least one sub-pixel column to be compensated.

For example, the differences between the voltage values of the plurality of sub-pixels in the at least one sub-pixel column to be compensated and the voltage values of corresponding adjacent sub-pixels in adjacent sub-pixel columns are greater than or equal to the second filtering threshold. In step S441, when the filtering detection is performed on the voltage values of all sub-pixels in the pixel array, the sub-pixels in the sub-pixel column to be compensated that meet the filtering compensation condition may be determined from all sub-pixels, and the sub-pixels in the sub-pixel column to be compensated are the sub-pixels corresponding to the abnormal line. In step S442, the filtering compensation is performed on the sub-pixels that meet the filter compensation condition, so that the filtering compensation is performed on the voltage values of the sub-pixels corresponding to the abnormal line, while the sub-pixels corresponding to the non-uniform brightness region may not be filtered mistakenly.

In embodiments of the present disclosure, step S442 of performing the filtering compensation on the voltage values of the plurality of sub-pixels in the at least one sub-pixel column to be compensated may include: acquiring the voltage values of a plurality of adjacent sub-pixels respectively corresponding to the plurality of sub-pixels from at least one adjacent sub-pixel column corresponding to the at least one sub-pixel column to be compensated: and updating the voltage values of the plurality of sub-pixels to the voltage values of the plurality of adjacent sub-pixels respectively.

The filtering compensation process will be described with reference to FIG. 4B and FIG. 4C.

Figure 4B:
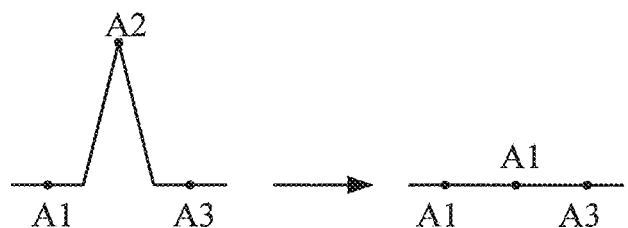
FIG. 4B shows a schematic diagram of a filtering compensation according to embodiments of the present disclosure.

FIG. 4B shows a schematic diagram of a filtering compensation according to embodiments of the present disclosure.

As shown in FIG. 4B, the voltage value of the sub-pixel in the sub-pixel column to be compensated is A2, and the voltage values of two adjacent sub-pixels corresponding to the sub-pixel in the sub-pixel column to be compensated are A1 and A3, respectively. The voltage values A1 and A3 of the two adjacent sub-pixels corresponding to the sub-pixel in the sub-pixel column to be compensated are both less than the voltage value A2 of the sub-pixel in the sub-pixel column to be compensated, and the differences between the voltage value A2 of the sub-pixel in the sub-pixel column to be compensated and the voltage values A1 and A3 of the corresponding two adjacent sub-pixels are both greater than the second filtering threshold. In this case, it may be considered that the voltage value A2 of the sub-pixel in the sub-pixel column to be compensated is peak data.

For example, the voltage value A2 of the sub-pixel in the sub-pixel column to be compensated may be updated to the voltage value A1 of the adjacent sub-pixel, so as to achieve a filtering compensation for the peak data. For example, the voltage value A2 of the sub-pixel in the sub-pixel column to be compensated may also be updated to the voltage value A3 of the adjacent sub-pixel, so as to achieve a filtering compensation for the peak data. After the filtering compensation is performed, the differences between the voltage values A1, A2, and A3 are less than the second filtering threshold.

Figure 4C:
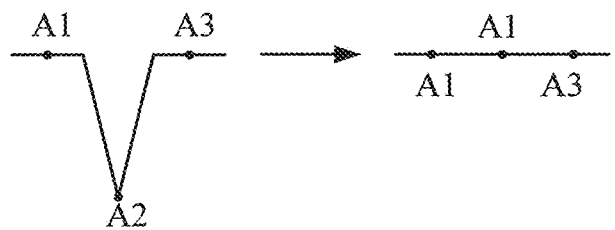
FIG. 4C shows a schematic diagram of a filtering compensation according to other embodiments of the present disclosure.

FIG. 4C shows a schematic diagram of a filtering compensation according to other embodiments of the present disclosure.

As shown in FIG. 4C, the voltage value of the sub-pixel in the sub-pixel column to be compensated is A2, and the voltage values of two adjacent sub-pixels corresponding to the sub-pixel in the sub-pixel column to be compensated are A1 and A3, respectively. The voltage values A1 and A3 of the two adjacent sub-pixels corresponding to the sub-pixel in the sub-pixel column to be compensated are both greater than the voltage value A2 of the sub-pixel in the sub-pixel column to be compensated, and the differences between the voltage value A2 of the sub-pixel in the sub-pixel column to be compensated and the voltage values A1 and A3 of the corresponding two adjacent sub-pixels are both greater than the second filtering threshold. In this case, it may be considered that the voltage value A2 of the sub-pixel in the sub-pixel column to be compensated is peak data.

For example, the voltage value A2 of the sub-pixel in the sub-pixel column to be compensated may be updated to the voltage value A1 of the adjacent sub-pixel, so as to achieve a filtering compensation for the peak data. For example, the voltage value A2 of the sub-pixel in the sub-pixel column to be compensated may also be updated to the voltage value A3 of the adjacent sub-pixel, so as to achieve a filtering compensation for the peak data. After the filtering compensation is performed, the differences between the voltage values A1, A2, and A3 are less than the second filtering threshold.

Figure 5A:
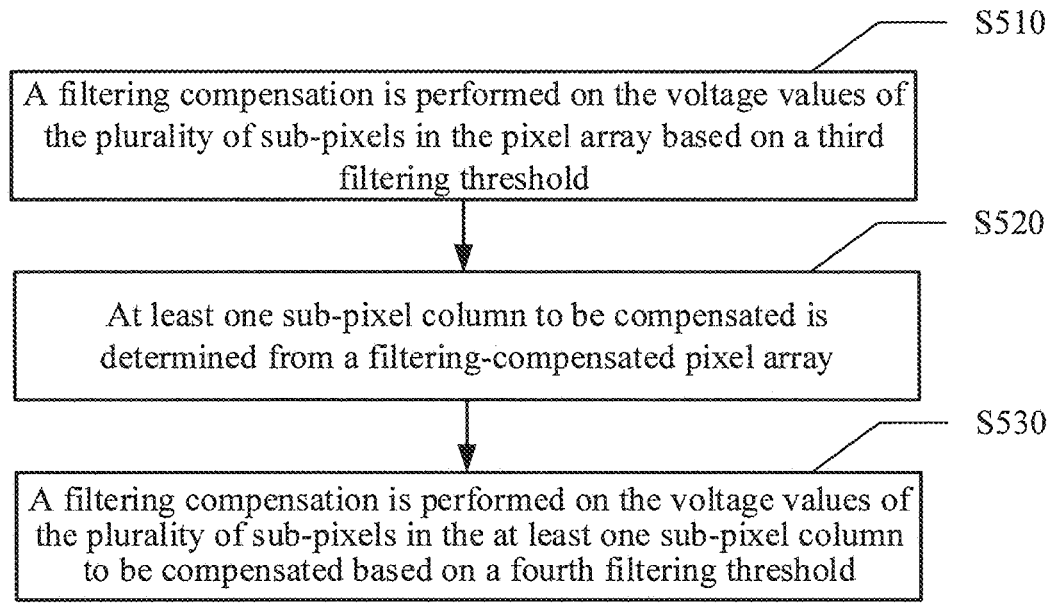
FIG. 5A shows a flowchart of a method of processing data according to other embodiments of the present disclosure.

FIG. 5A shows a flowchart of a method of processing data according to other embodiments of the present disclosure.

As shown in FIG. 5A, the method of processing the data may further include step S510 to step S530.

In step S510, a filtering compensation is performed on the voltage values of the plurality of sub-pixels in the pixel array based on a third filtering threshold, and the third filtering threshold is greater than the second filtering threshold.

In step S520, at least one sub-pixel column to be compensated is determined from the filtering-compensated pixel array.

The differences between the voltage values of the plurality of sub-pixels in the at least one sub-pixel column to be compensated and the voltage values of adjacent sub-pixels are greater than the second filtering threshold and less than the third filtering threshold.

In step S530, a filtering compensation is performed on the voltage values of the plurality of sub-pixels in the at least one sub-pixel column to be compensated based on a fourth filtering threshold, and the fourth filtering threshold is less than the third filtering threshold and greater than the first filtering threshold.

In embodiments of the present disclosure, the display panel may have a plurality of abnormal lines caused by short points, and the plurality of abnormal lines may be at different degrees of short circuits. Therefore, the differences between the voltage values of sub-pixels corresponding to different abnormal lines and the voltage values of adjacent sub-pixels may also vary.

A difference between the voltage value of a sub-pixel corresponding to an abnormal line at a high degree of short circuit and the voltage value of a corresponding adjacent sub-pixel is greater than a difference between the voltage value of a sub-pixel corresponding to an abnormal line at a low degree of short circuit and the voltage value of a corresponding adjacent sub-pixel. Furthermore, as the difference between the voltage value of the sub-pixel corresponding to the abnormal line and the voltage value of the corresponding adjacent sub-pixel is greater than the difference between the voltage value of the sub-pixel in the non-uniform brightness region and the voltage value of the corresponding adjacent sub-pixel, the filtering compensation may be performed on the sub-pixels firstly based on a large filtering threshold (the third filtering threshold), so that the voltage values of the sub-pixels corresponding to the abnormal line at a high degree of short circuit may be filtering-compensated, while the voltage values of the sub-pixels corresponding to the abnormal line at a low degree of short circuit and the voltage values of the sub-pixels in the non-uniform brightness region may not be filtering-compensated.

After the first filtering compensation is performed, the voltage values of the sub-pixels corresponding to the abnormal line at a high degree of short circuit are filtering-compensated, but the abnormal line at a low degree of short circuit may still be displayed on the display panel. In this case, it is possible to determine the voltage values of the sub-pixels corresponding to the abnormal line at a low degree of short circuit based on the position of the abnormal line at a low degree of short circuit, and determine a filtering threshold (the fourth filtering threshold) based on the voltage values. A second filtering compensation may be performed according to the filtering threshold, and the voltage values of the sub-pixels corresponding to the abnormal line at a low degree of short circuit may be filtering-compensated.

Figure 5B:
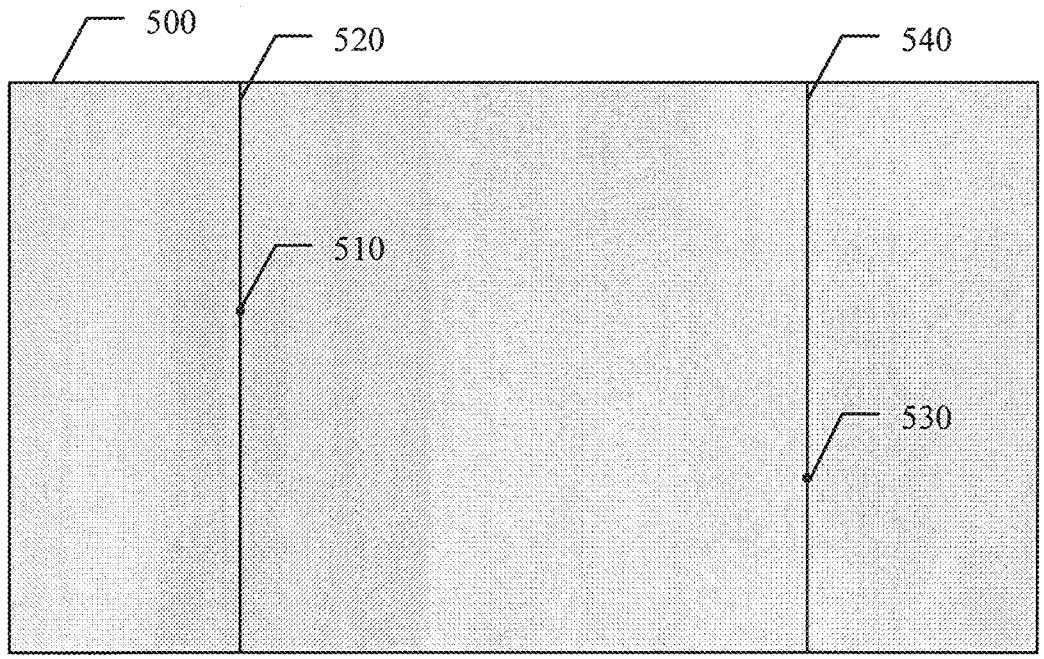
FIG. 5B shows a schematic diagram of an abnormal display on a display panel according to embodiments of the present disclosure.
Figure 5C:
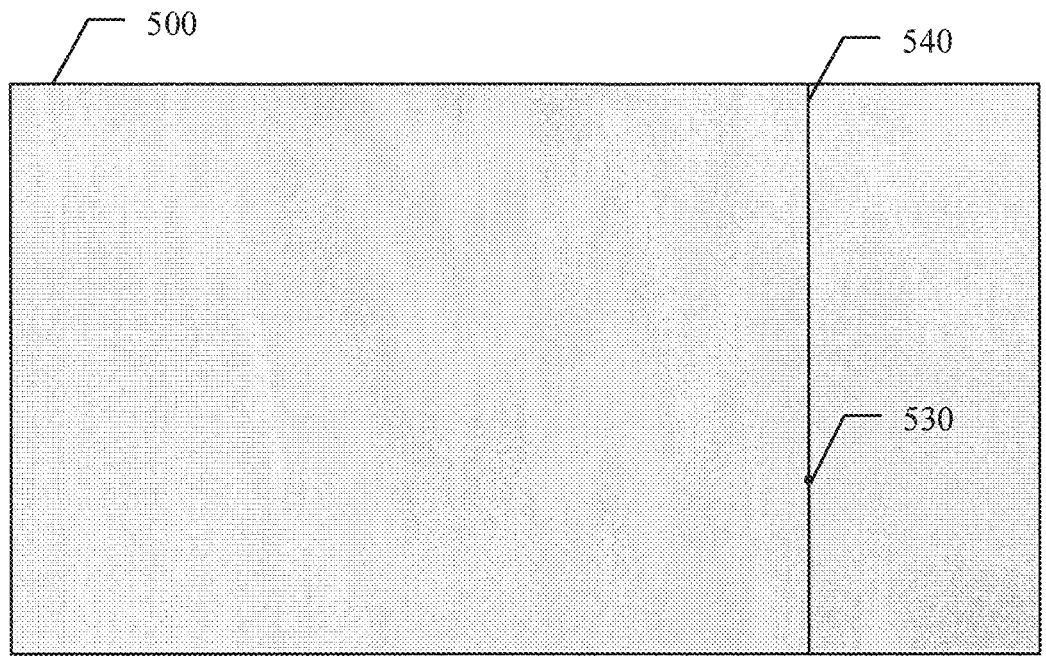
FIG. 5C shows a schematic diagram of an abnormal display on a display panel according to other embodiments of the present disclosure.

The filtering compensation process will be schematically described with reference to FIG. 5B and FIG. 5C. FIG. 5B shows a schematic diagram of an abnormal display on a display panel according to embodiments of the present disclosure. FIG. 5C shows a schematic diagram of an abnormal display on a display panel according to other embodiments of the present disclosure. For example, FIG. 5B shows an abnormal display screen before the filtering compensation is performed, and FIG. 5B shows an abnormal display screen after the first filtering compensation is performed.

Before the filtering compensation is performed, the threshold voltages of the driving transistors of all sub-pixels in the pixel array are detected, and a data conversion is performed on all threshold voltages to obtain a Map view, as shown in FIG. 5B.

As shown in FIG. 5B, in the Map view, a display screen of a display panel 500 contains a short point 510 and a short point 530, the short point 510 causes an abnormal line 520, and the short point 530 causes an abnormal line 540.

For example, in the first filtering compensation, the filtering compensation is performed on sub-pixels based on the third filtering threshold. The third filtering threshold is greater than the second filtering threshold, so that the voltage values of the sub-pixels corresponding to the abnormal line at a high degree of short circuit is filtering-compensated. After the first filtering compensation is performed, the abnormal line at a high degree of short circuit may be eliminated.

When the filtering compensation is performed on sub-pixels based on the third filtering threshold, as the third filtering threshold is greater than the second filtering threshold, the voltage values of the sub-pixels corresponding to the abnormal lines at a low degree of short circuit and the voltage values of the sub-pixels in the non-uniform brightness region may not be filtering-compensated.

After the first filtering compensation is performed, the threshold voltages of the driving transistors of all sub-pixels in the pixel array are detected, and a data conversion is performed on all threshold voltages to obtain a Map view, as shown in FIG. 5C.

As shown in FIG. 5C, in the Map view, the display screen of the display panel 500 contains the short point 530, which causes the abnormal line 540.

For example, a position of a sub-pixel column corresponding to the abnormal line 540 may be determined according to a position of the abnormal line 540 in the Map view. The differences between the voltage values of the plurality of sub-pixels in the sub-pixel column corresponding to abnormal line 540 and the voltage values of adjacent sub-pixels are greater than the second filtering threshold and less than the third filtering threshold.

For example, the fourth filtering threshold is determined according to the differences between the voltage values of the plurality of sub-pixels in the sub-pixel column corresponding to abnormal line 540 and the voltage values of the adjacent sub-pixels. The differences between the voltage values of the plurality of sub-pixels in the sub-pixel column corresponding to abnormal line 540 and the voltage values of the adjacent sub-pixels are greater than or equal to the fourth filtering threshold. In the second filtering compensation, the filtering compensation is performed on the voltage values of the plurality of sub-pixels in the sub-pixel column corresponding to the abnormal line 540 based on the fourth filtering threshold. The fourth filtering threshold is less than the third filtering threshold and greater than the first filtering threshold.

For example, when the position of the sub-pixel column corresponding to the abnormal line 540 is determined, coordinate information of all the sub-pixels to be compensated of the sub-pixel column corresponding to the abnormal line 540 in the pixel array may be saved. For example, the coordinate information may be saved in an electrically erasable programmable read only memory (EEPROM). In the second filtering compensation, the coordinate information of the sub-pixels to be compensated in the EEPROM is read preferentially, and a filtering is performed on data (voltage value) of the coordinate information to solve the harmful line.

In the second filtering compensation, the filtering compensation is performed on the coordinate information of the sub-pixels to be compensated in the pixel array based on the fourth filtering threshold or the coordinate information of the sub-pixels to be compensated, so that the voltage values of the sub-pixels corresponding to the abnormal line at a low degree of short circuit is filtering-compensated. After the second filtering compensation is performed, the abnormal line at a low degree of short circuit may be eliminated.

After two filtering compensations are performed, both the abnormal line at a high degree of short circuit and the abnormal line at a low degree of short circuit may be eliminated, and the voltage values of the sub-pixels in the non-uniform brightness region may not be filtering-compensated.

Figure 6A:
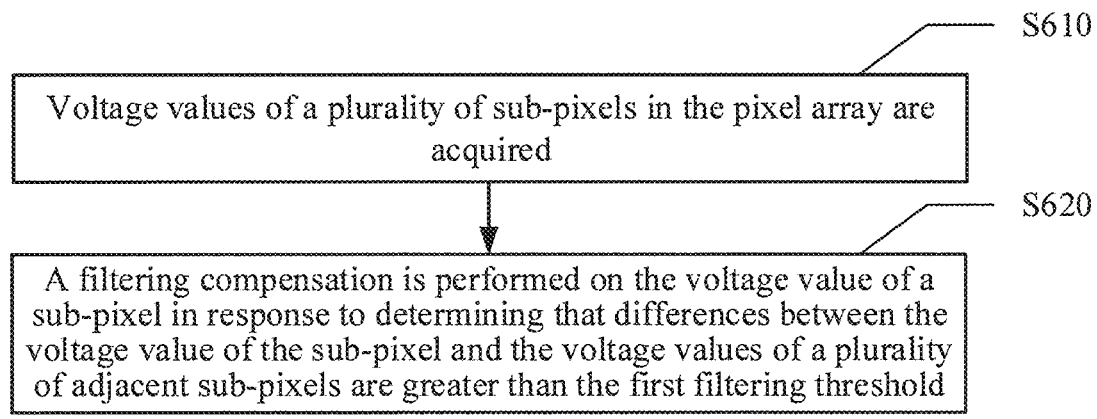
FIG. 6A shows a flowchart of a method of processing data according to other embodiments of the present disclosure.

FIG. 6A shows a flowchart of a method of processing data according to other embodiments of the present disclosure.

As shown in FIG. 6A, the method of processing the data may further include step S610 to step S620.

In step S610, voltage values of a plurality of sub-pixels in the pixel array are acquired.

In step S620, a filtering compensation is performed on the voltage value of a sub-pixel in response to determining that differences between the voltage value of the sub-pixel and the voltage values of a plurality of adjacent sub-pixels are greater than the first filtering threshold.

The plurality of adjacent sub-pixels are respectively located in a plurality of adjacent sub-pixel columns to a sub-pixel column where the corresponding sub-pixel is located. For example, the plurality of adjacent sub-pixels include four adjacent sub-pixels, the sub-pixel is located in the third sub-pixel column, and the four adjacent sub-pixels are respectively located in the first sub-pixel column, the second sub-pixel column, the fourth sub-pixel column, and the fifth sub-pixel column.

As the voltage values of the sub-pixels in the non-uniform brightness region are short-range non-uniform, the voltage values of the sub-pixels in the non-uniform brightness region are unevenly distributed. The sub-pixels in the non-uniform brightness region are located in a same sub-pixel row, and the voltage values of the plurality of sub-pixels may not contain significant peak data. For example, it is possible not all the voltage values of sub-pixels in the non-uniform brightness region are greater than the voltage values of a plurality of adjacent sub-pixels. For example, the voltage values of five sub-pixels located in the same sub-pixel row in the non-uniform brightness region may be 0.9V, 1.2V, 1.3V, 1V, and 1.5V. The voltage values of five sub-pixels located in the same sub-pixel row in the non-uniform brightness region may also be 0.9V, 1V, 1.2V, 1.3V, and 1.5V.

In the same sub-pixel row, only the voltage value of the sub-pixel corresponding to the abnormal line is abnormal, and the voltage values of adjacent sub-pixels are all normal. Therefore, the voltage value of the sub-pixel corresponding to the abnormal line may be significantly greater or less than the voltage values of a plurality of adjacent sub-pixels. In a sub-pixel row that contains the sub-pixel corresponding to the abnormal line, significant peak data may appear in the voltage values of the plurality of sub-pixels, and the voltage value of the sub-pixel corresponding to the abnormal line is the peak data.

For example, when it is determined that differences between the voltage value of a sub-pixel and the voltage values of a plurality of adjacent sub-pixels are all greater than the first filtering threshold, the voltage value of that sub-pixel may be considered as the peak data. When it is determined that the voltage values of a plurality of sub-pixels in a sub-pixel row include peak data, a filtering compensation may be performed on the peak data to eliminate the abnormal display.

The filtering compensation process will be described with reference to FIG. 6B and FIG. 6C.

Figure 6B:
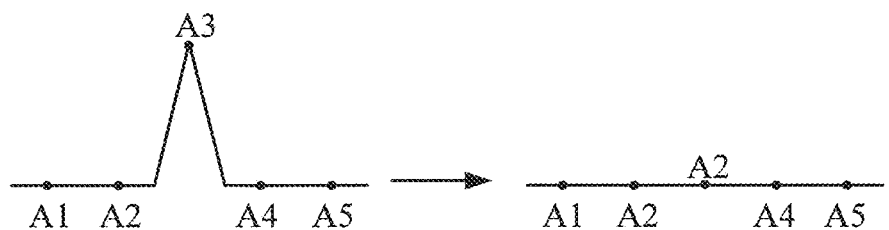
FIG. 6B shows a schematic diagram of a filtering compensation according to other embodiments of the present disclosure.

FIG. 6B shows a schematic diagram of a filtering compensation according to other embodiments of the present disclosure.

As shown in FIG. 6B, voltage values A1, A2, A3, A4 and A5 of a plurality of sub-pixels located in a same sub-pixel row in the pixel array are acquired. The voltage values A1, A2, A3, A4 and A5 include obvious peak data (voltage value A3).

The voltage value A3 is greater than each of the plurality of adjacent voltage values A1, A2, A4 and A5, and the differences between A3 and the plurality of adjacent voltage values A1, A2, A4 and A5 are all greater than the first filtering threshold. It may be considered that the sub-pixel corresponding to the voltage value A3 is located on the abnormal line, and the sub-pixel corresponding to the voltage value A3 is the sub-pixel to be compensated. For example, the voltage value A3 of the sub-pixel in the sub-pixel column to be compensated may be updated to the voltage value A2 of the adjacent sub-pixel, so as to achieve a filtering compensation for the peak data. For example, it is also possible to update the voltage value A2 of the sub-pixel in the sub-pixel column to be compensated to the voltage value A4 of the adjacent sub-pixel, so as to achieve a filtering compensation for the peak data. The differences between the voltage values A1, A2, A3, A4 and A5 obtained after the filtering compensation is performed are less than the first filtering threshold.

Figure 6C:
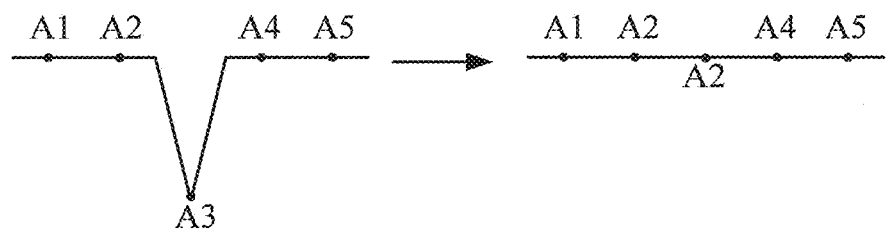
FIG. 6C shows a schematic diagram of a filtering compensation according to other embodiments of the present disclosure.

FIG. 6C shows a schematic diagram of a filtering compensation according to other embodiments of the present disclosure.

As shown in FIG. 6B, voltage values A1, A2, A3, A4 and A5 of a plurality of sub-pixels located in a same sub-pixel row in the pixel array are acquired. The voltage values A1, A2, A3, A4 and A5 include obvious peak data (voltage value A3).

The voltage value A3 is less than each of the plurality of adjacent voltage values A1, A2, A4 and A5, and the differences between the voltage value A3 and the plurality of adjacent voltage values A1, A2, A4 and A5 are all greater than the first filtering threshold. It may be considered that the sub-pixel corresponding to the voltage value A3 is located on the abnormal line, and the sub-pixel corresponding to the voltage value A3 is the sub-pixel to be compensated. For example, the voltage value A3 of the sub-pixel in the sub-pixel column to be compensated may be updated to the voltage value A2 of the adjacent sub-pixel, so as to achieve a filtering compensation for the peak data. For example, it is also possible to update the voltage value A2 of the sub-pixel in the sub-pixel column to be compensated to the voltage value A4 of the adjacent sub-pixel, so as to achieve a filtering compensation for the peak data. The differences between the voltage values A1, A2, A3, A4 and A5 obtained after the filtering compensation is performed are less than the first filtering threshold.

Based on the method of processing the data described above, the present disclosure further provides an apparatus of processing data, which will be described in detail below with reference to FIG. 7.

Figure 7:
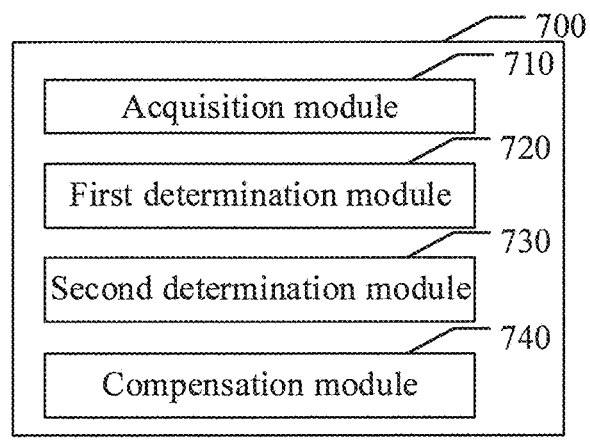
FIG. 7 shows a structural block diagram of an apparatus of processing data according to embodiments of the present disclosure.

FIG. 7 shows a structural block diagram of an apparatus of processing data according to embodiments of the present disclosure.

As shown in FIG. 7, an apparatus 700 of processing data according to such embodiments of the present disclosure includes an acquisition module 710, a first determination module 720, a second determination module 730, and a compensation module 740

The acquisition module 710 is used to acquire voltage values of a plurality of sub-pixels to be detected in a plurality of sub-pixel rows to be detected in the pixel array. In an embodiment, the acquisition module 710 may be used to perform operation S210 described above, which will not be repeated here.

The first determination module 720 is used to determine a plurality of sub-pixels to be compensated from the plurality of sub-pixels to be detected according to the voltage values of the plurality of sub-pixels to be detected. In an embodiment, the first determination module 720 may be used to perform operation S220 described above, which will not be repeated here.

The second determination module 730 is used to determine at least one sub-pixel column to be compensated according to a position of the plurality of sub-pixels to be compensated in the pixel array. In an embodiment, the second determination module 730 may be used to perform operation S230 described above, which will not be repeated here.

The compensation module 740 is used to perform a filtering compensation on the voltage values of a plurality of sub-pixels in the at least one sub-pixel column to be compensated based on a second filtering threshold In an embodiment, the compensation module 740 may be used to perform operation S240 described above, which will not be repeated here.

According to embodiments of the present disclosure, any number of the acquisition module 710, the first determination module 720, the second determination module 730 and the compensation module 740 may be combined into one module for implementation, or any one of the modules may be divided into a plurality of modules. Alternatively, at least part of the functions of one or more of these modules may be combined with at least part of the functions of other modules and implemented in one module. According to embodiments of the present disclosure, at least one of the acquisition module 710, the first determination module 720, the second determination module 730 and the compensation module 740 may be implemented at least partially as a hardware circuit, such as a field programmable gate array (FPGA), a programmable logic array (PLA), a system on a chip, a system on a substrate, a system on a package, an application specific integrated circuit (ASIC), or may be implemented by hardware or firmware in any other reasonable manner of integrating or encapsulating the circuit, or may be implemented by any one of the three implementation modes of software, hardware and firmware or an appropriate combination thereof. Alternatively, at least one of the acquisition module 710, the first determination module 720, the second determination module 730 and the compensation module 740 may be at least partially implemented as a computer program module that may perform corresponding functions when executed.

Figure 8:
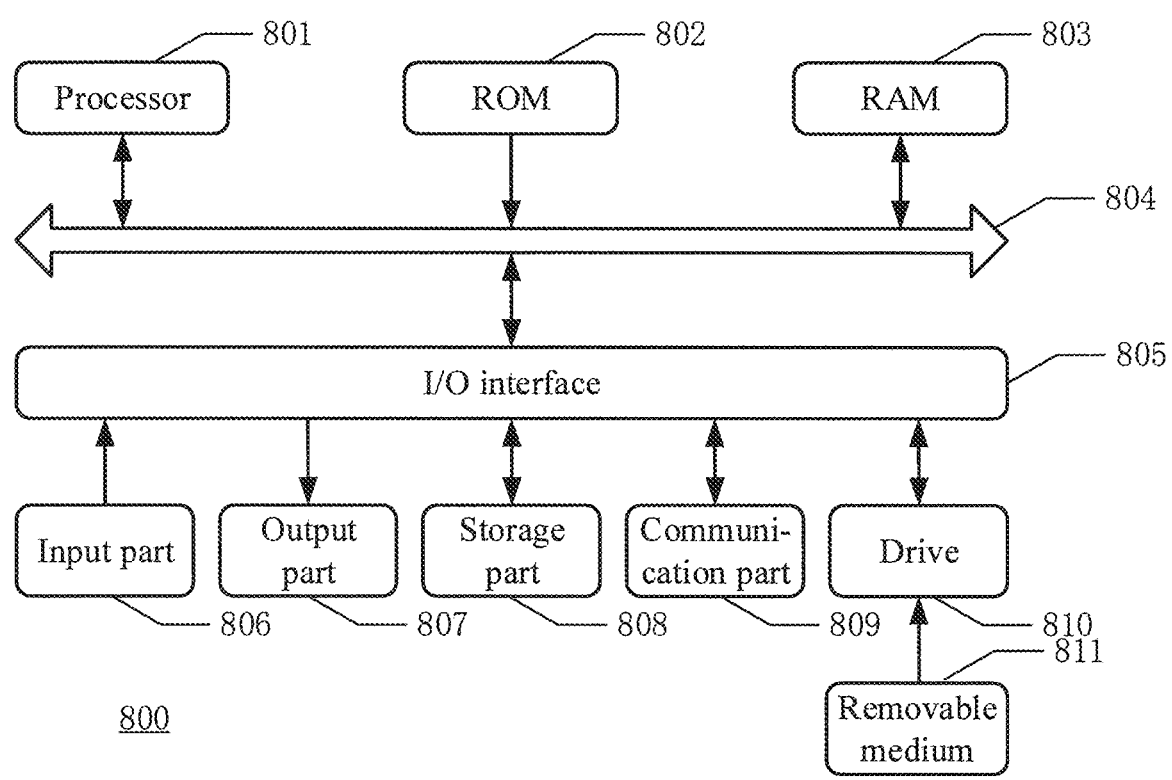
FIG. 8 shows a structural block diagram of an electronic device suitable for implementing a method of processing data according to embodiments of the present disclosure.

FIG. 8 shows a structural block diagram of an electronic device suitable for implementing the method of processing the data according to embodiments of the present disclosure.

As shown in FIG. 8, an electronic device 800 according to the embodiments of the present disclosure includes a processor 801, which may execute various appropriate actions and processing according to the program stored in a read only memory (ROM) 802 or the program loaded into a random access memory (RAM) 803 from a storage part 808. The processor 801 may, for example, include a general-purpose microprocessor (for example, CPU), an instruction set processor and/or a related chipset and/or a special-purpose microprocessor (for example, an application specific integrated circuit (ASIC)), and the like. The processor 801 may further include an on-board memory for caching purposes. The processor 801 may include a single processing unit or plurality of processing units for executing different actions of the method flow according to embodiments of the present disclosure.

Various programs and data required for the operation of the electronic device 800 are stored in the RAM 803. The processor 801, the ROM 802 and the RAM 803 are connected to each other through a bus 804. The processor 801 executes various operations of the method flow according to embodiments of the present disclosure by executing the programs in the ROM 802 and/or the RAM 803. It should be noted that the program may also be stored in one or more memories other than the ROM 802 and the RAM 803. The processor 801 may also execute various operations of the method flow according to embodiments of the present disclosure by executing the programs stored in the one or more memories.

According to embodiments of the present disclosure, the electronic device 800 may further include an input/output (I/O) interface 805 which is also connected to the bus 804. The electronic device 800 may further include one or more of the following components connected to the I/O interface 805: an input part 806 including a keyboard, a mouse, etc.; an output part 807 including a cathode ray tube (CRT), a liquid crystal display (LCD), etc. and a speaker, etc.; a storage part 808 including a hard disk, etc.; and a communication part 809 including a network interface card such as a LAN card, a modem, and the like. The communication part 809 performs communication processing via a network such as the Internet. A drive 810 is also connected to the I/O interface 805 as required. A removable medium 811, such as a magnetic disk, an optical disk, a magneto-optical disk, a semiconductor memory, and the like, is installed on the drive 810 as required, so that the computer program read therefrom is installed into the storage part 808 as needed.

The present disclosure further provides a computer-readable storage medium, which may be included in the apparatus/device/system described in the above embodiments: or exist alone without being assembled into the apparatus/device/system. The above-mentioned computer-readable storage medium carries one or more programs that when executed, perform the methods according to embodiments of the present disclosure.

According to embodiments of the present disclosure, the computer-readable storage medium may be a non-transitory computer-readable storage medium, for example, may include but not limited to: a portable computer disk, a hard disk, a random access memory (RAM), a read-only memory (ROM), an erasable programmable read-only memory (EPROM or flash memory), a portable compact disk read-only memory (CD-ROM), an optical storage device, a magnetic storage device, or any suitable combination of the above. In the present disclosure, the computer-readable storage medium may be any tangible medium that contains or stores programs that may be used by or in combination with an instruction execution system, apparatus or device. For example, according to embodiments of the present disclosure, the computer-readable storage medium may include the above-mentioned ROM 802 and/or RAM 803 and/or one or more memories other than the ROM 802 and RAM 803.

Embodiments of the present disclosure further include a computer program product, which contains a computer program. The computer program contains program code for performing the method provided by the embodiments of the present disclosure. When the computer program product runs on an electronic device, the program code causes the electronic device to implement the method of processing the data provided in the embodiments of the present disclosure.

When the computer program is executed by the processor 801, the above-mentioned functions defined in the system/apparatus of the embodiments of the present disclosure are performed. According to the embodiments of the present disclosure, the above-described systems, apparatuses, modules, units, etc. may be implemented by computer program modules.

In an embodiment, the computer program may rely on a tangible storage medium such as an optical storage device and a magnetic storage device. In another embodiment, the computer program may also be transmitted and distributed in the form of signals on a network medium, downloaded and installed through the communication part 809, and/or installed from the removable medium 811. The program code contained in the computer program may be transmitted by any suitable medium, including but not limited to a wireless one, a wired one, or any suitable combination of the above.

In such embodiments, the computer program may be downloaded and installed from the network through the communication part 809, and/or installed from the removable medium 811. When the computer program is executed by the processor 801, the above-mentioned functions defined in the system of the embodiments of the present disclosure are performed. According to the embodiments of the present disclosure, the above-described systems, apparatuses, devices, modules, units, etc. may be implemented by computer program modules.

According to the embodiments of the present disclosure, the program code for executing the computer programs provided by the embodiments of the present disclosure may be written in any combination of one or more programming languages. In particular, these computing programs may be implemented using high-level procedures and/or object-oriented programming languages, and/or assembly/machine languages. Programming languages include, but are not limited to, Java, C++, Python, "C" language or similar programming languages. The program code may be completely executed on the user computing device, partially executed on the user device, partially executed on the remote computing device, or completely executed on the remote computing device or server. In a case of involving a remote computing device, the remote computing device may be connected to a user computing device through any kind of network, including a local area network (LAN) or a wide area networks (WAN), or may be connected to an external computing device (e.g., through the Internet using an Internet service provider).

The flowcharts and block diagrams in the accompanying drawings illustrate the possible architecture, functions, and operations of the system, method, and computer program product according to various embodiments of the present disclosure. In this regard, each block in the flowcharts or block diagrams may represent a part of a module, a program segment, or a code, which part includes one or more executable instructions for implementing the specified logical function. It should be further noted that, in some alternative implementations, the functions noted in the blocks may also occur in a different order from that noted in the accompanying drawings. For example, two blocks shown in succession may actually be executed substantially in parallel, or they may sometimes be executed in a reverse order, depending on the functions involved. It should be further noted that each block in the block diagrams or flowcharts, and the combination of blocks in the block diagrams or flowcharts, may be implemented by a dedicated hardware-based system that performs the specified functions or operations, or may be implemented by a combination of dedicated hardware and computer instructions.

Those skilled in the art may understand that the various embodiments of the present disclosure and/or the features described in the claims may be combined in various ways, even if such combinations are not explicitly described in the present disclosure. In particular, without departing from the spirit and teachings of the present disclosure, the various embodiments of the present disclosure and/or the features described in the claims may be combined in various ways. All these combinations fall within the scope of the present disclosure.

The embodiments of the present disclosure have been described above. However, these embodiments are for illustrative purposes only, and are not intended to limit the scope of the present disclosure. Although the various embodiments have been described separately above, this does not mean that measures in the respective embodiments may not be used in combination advantageously. The scope of the present disclosure is defined by the appended claims and their equivalents. Those skilled in the art may make various substitutions and modifications without departing from the scope of the present disclosure, and these substitutions and modifications should all fall within the scope of the present disclosure.

What is claimed is:

1. A method of processing data, applied to a pixel array, the method comprising:
    acquiring voltage values of a plurality of sub-pixels to be detected in a plurality of sub-pixel rows to be detected in the pixel array;
    determining a plurality of sub-pixels to be compensated from the plurality of sub-pixels to be detected according to the voltage values of the plurality of sub-pixels to be detected, wherein differences between the voltage values of the plurality of sub-pixels to be compensated and voltage values of corresponding adjacent sub-pixels are greater than or equal to a first filtering threshold, the adjacent sub-pixel and the corresponding sub-pixel to be detected are located in a same sub-pixel row to be detected, and are respectively located in adjacent sub-pixel columns;
    determining at least one sub-pixel column to be compensated according to a position of the plurality of sub-pixels to be compensated in the pixel array; and
    performing a filtering compensation on the voltage values of a plurality of sub-pixels in the at least one sub-pixel column to be compensated based on a second filtering threshold, wherein the second filtering threshold is greater than the first filtering threshold.

2. The method according to claim 1, wherein the performing a filtering compensation on the voltage values of a plurality of sub-pixels in the at least one sub-pixel column to be compensated based on a second filtering threshold comprises:
    acquiring the voltage values of the plurality of sub-pixels in the at least one sub-pixel column to be compensated and the voltage values of adjacent sub-pixels corresponding to the plurality of sub-pixels, wherein the adjacent sub-pixels are located in sub-pixel columns adjacent to the at least one sub-pixel column to be compensated;
    determining the second filtering threshold according to a plurality of differences between the voltage values of the plurality of sub-pixels and the voltage values of the corresponding adjacent sub-pixels, wherein the second filtering threshold is less than the plurality of differences; and
    performing a filtering compensation on the voltage values of the plurality of sub-pixels in the at least one sub-pixel column to be compensated based on the second filtering threshold.

3. The method according to claim 1, wherein the plurality of sub-pixel rows to be detected comprise N sub-pixel rows to be detected, the plurality of sub-pixels to be compensated comprise M sub-pixels to be compensated, M≥N>1, M and N are positive integers, and the determining at least one sub-pixel column to be compensated according to a position of the plurality of sub-pixels to be compensated in the pixel array comprises:
    acquiring column coordinates of the M sub-pixels to be compensated in the pixel array;
    determining i*N target sub-pixels from the M sub-pixels to be compensated according to the column coordinates, wherein each N target sub-pixels in the i*N target sub-pixels have a same column coordinate, i*N≤M, i≥1, and i is a positive integer; and
    determining i sub-pixel columns to be compensated according to the column coordinate of each N target sub-pixels in the i*N target sub-pixels, wherein each of the i sub-pixel columns to be compensated contains corresponding N target sub-pixels.

4. The method according to claim 3, wherein a first difference is greater than a second difference; and
    wherein the M sub-pixels to be compensated comprise i*N target sub-pixels and M-i*N sub-pixels to be compensated, the first difference is a minimum difference in i*N differences between the voltage values of the i*N target sub-pixels and the voltage values of corresponding adjacent sub-pixels, and the second difference is a maximum difference in M-i*N differences between the voltage values of the M-i*N sub-pixels to be compensated and the voltage values of corresponding adjacent sub-pixels.

5. The method according to claim 4, wherein the second filtering threshold is greater than the second difference and less than or equal to the first difference.

6. The method according to claim 5, wherein the performing a filtering compensation on the voltage values of a plurality of sub-pixels in the at least one sub-pixel column to be compensated based on a second filtering threshold comprises:

performing a filtering detection on the voltage values of all sub-pixels in the pixel array based on the second filtering threshold, so as to obtain the plurality of sub-pixels in the at least one sub-pixel column to be compensated, wherein the differences between the voltage values of the plurality of sub-pixels in the at least one sub-pixel column to be compensated and the voltage values of corresponding adjacent sub-pixels in an adjacent sub-pixel column are greater than or equal to the second filtering threshold; and performing a filtering compensation on the voltage values of the plurality of sub-pixels in the at least one sub-pixel column to be compensated.

7. The method according to claim 6, wherein the performing a filtering compensation on the voltage values of the plurality of sub-pixels in the at least one sub-pixel column to be compensated comprises:

acquiring voltage values of a plurality of adjacent sub-pixels respectively corresponding to the plurality of sub-pixels from at least one adjacent sub-pixel column corresponding to the at least one sub-pixel column to be compensated; and updating the voltage values of the plurality of sub-pixels to the voltage values of the plurality of adjacent sub-pixels respectively.

8. The method according to claim 1, wherein the plurality of sub-pixels in the at least one sub-pixel column to be compensated are electrically connected to a short point respectively.

9. The method according to claim 1, wherein the plurality of sub-pixel rows to be detected are consecutive sub-pixel rows.

10. The method according to claim 1, wherein the plurality of sub-pixel rows to be detected are sub-pixel rows at predetermined intervals.

11. The method according to claim 1, further comprising:
performing a filtering compensation on the voltage values of a plurality of sub-pixels in the pixel array based on a third filtering threshold, wherein the third filtering threshold is greater than the second filtering threshold;

determining at least one sub-pixel column to be compensated in the filtering-compensated pixel array, wherein differences between the voltage values of a plurality of sub-pixels in the at least one sub-pixel column to be compensated and the voltage values of adjacent sub-pixels are greater than the second filtering threshold and less than the third filtering threshold; and performing a filtering compensation on the voltage values of the plurality of sub-pixels in the at least one sub-pixel column to be compensated based on a fourth filtering threshold, wherein the fourth filtering threshold is less than the third filtering threshold and greater than the first filtering threshold.

12. The method according to claim 1, further comprising:
acquiring voltage values of a plurality of sub-pixels in the pixel array; and
performing a filtering compensation on the voltage value of a sub-pixel in response to determining that differences between the voltage value of the sub-pixel and the voltage values of a plurality of adjacent sub-pixels are greater than the first filtering threshold, wherein the plurality of adjacent sub-pixels are respectively located in a plurality of adjacent sub-pixel columns to a sub-pixel column where the corresponding sub-pixel is located.

13. An electronic device, comprising:
one or more processors; and a memory configured to store one or more programs, wherein the one or more programs, when executed by the one or more processors, are configured to cause the one or more processors to:

acquire voltage values of a plurality of sub-pixels to be detected in a plurality of sub-pixel rows to be detected in the pixel array;

determine a plurality of sub-pixels to be compensated from the plurality of sub-pixels to be detected according to the voltage values of the plurality of sub-pixels to be detected, wherein differences between the voltage values of the plurality of sub-pixels to be compensated and voltage values of corresponding adjacent sub-pixels are greater than or equal to a first filtering threshold, the adjacent sub-pixel and the corresponding sub-pixel to be detected are located in a same sub-pixel row to be detected, and are respectively located in adjacent sub-pixel columns;

determine at least one sub-pixel column to be compensated according to a position of the plurality of sub-pixels to be compensated in the pixel array; and perform a filtering compensation on the voltage values of a plurality of sub-pixels in the at least one sub-pixel column to be compensated based on a second filtering threshold, wherein the second filtering threshold is greater than the first filtering threshold.

14. The electronic device according to claim 13, wherein the one or more processors are further configured for:

acquiring the voltage values of the plurality of sub-pixels in the at least one sub-pixel column to be compensated and the voltage values of adjacent sub-pixels corresponding to the plurality of sub-pixels, wherein the adjacent sub-pixels are located in sub-pixel columns adjacent to the at least one sub-pixel column to be compensated;

determining the second filtering threshold according to a plurality of differences between the voltage values of the plurality of sub-pixels and the voltage values of the corresponding adjacent sub-pixels, wherein the second filtering threshold is less than the plurality of differences; and performing a filtering compensation on the voltage values of the plurality of sub-pixels in the at least one sub-pixel column to be compensated based on the second filtering threshold.

15. The electronic device according to claim 13, wherein the plurality of sub-pixel rows to be detected comprise N sub-pixel rows to be detected, the plurality of sub-pixels to be compensated comprise M sub-pixels to be compensated, M≥N>1, M and N are positive integers, and the one or more processors are further configured for:

acquiring column coordinates of the M sub-pixels to be compensated in the pixel array;

determining i*N target sub-pixels from the M sub-pixels to be compensated according to the column coordinates, wherein each N target sub-pixels in the i*N target sub-pixels have a same column coordinate, i*N≤M, i≥1, and i is a positive integer; and determining i sub-pixel columns to be compensated according to the column coordinate of each N target sub-pixels in the i*N target sub-pixels, wherein each of the i sub-pixel columns to be compensated contains corresponding N target sub-pixels.

16. The electronic device according to claim 15, wherein a first difference is greater than a second difference; and wherein the M sub-pixels to be compensated comprise i*N target sub-pixels and M-i*N sub-pixels to be compensated, the first difference is a minimum difference in i*N differences between the voltage values of the i*N target sub-pixels and the voltage values of corresponding adjacent sub-pixels, and the second difference is a maximum difference in M-i*N differences between the voltage values of the M-i*N sub-pixels to be compensated and the voltage values of corresponding adjacent sub-pixels.

17. The electronic device according to claim 16, wherein the second filtering threshold is greater than the second difference and less than or equal to the first difference.

18. The electronic device according to claim 17, wherein the one or more processors are further configured for:
performing a filtering detection on the voltage values of all sub-pixels in the pixel array based on the second filtering threshold, so as to obtain the plurality of sub-pixels in the at least one sub-pixel column to be compensated, wherein the differences between the voltage values of the plurality of sub-pixels in the at least one sub-pixel column to be compensated and the voltage values of corresponding adjacent sub-pixels in an adjacent sub-pixel column are greater than or equal to the second filtering threshold; and
performing a filtering compensation on the voltage values of the plurality of sub-pixels in the at least one sub-pixel column to be compensated.

19. The electronic device according to claim 18, wherein the one or more processors are further configured for:
acquiring voltage values of a plurality of adjacent sub-pixels respectively corresponding to the plurality of sub-pixels from at least one adjacent sub-pixel column corresponding to the at least one sub-pixel column to be compensated; and
updating the voltage values of the plurality of sub-pixels to the voltage values of the plurality of adjacent sub-pixels respectively.

20. A non-transitory computer-readable storage medium having executable instructions therein, wherein the instructions, when executed by a processor, are configured to cause the processor to:
acquire voltage values of a plurality of sub-pixels to be detected in a plurality of sub-pixel rows to be detected in the pixel array;
determine a plurality of sub-pixels to be compensated from the plurality of sub-pixels to be detected according to the voltage values of the plurality of sub-pixels to be detected, wherein differences between the voltage values of the plurality of sub-pixels to be compensated and voltage values of corresponding adjacent sub-pixels are greater than or equal to a first filtering threshold, the adjacent sub-pixel and the corresponding sub-pixel to be detected are located in a same sub-pixel row to be detected, and are respectively located in adjacent sub-pixel columns;
determine at least one sub-pixel column to be compensated according to a position of the plurality of sub-pixels to be compensated in the pixel array; and
perform a filtering compensation on the voltage values of a plurality of sub-pixels in the at least one sub-pixel column to be compensated based on a second filtering threshold, wherein the second filtering threshold is greater than the first filtering threshold.

* * * * *